United States Patent
Hendricks et al.

(10) Patent No.: US 6,675,386 B1
(45) Date of Patent: Jan. 6, 2004

(54) APPARATUS FOR VIDEO ACCESS AND CONTROL OVER COMPUTER NETWORK, INCLUDING IMAGE CORRECTION

(75) Inventors: John S. Hendricks, Potomac, MD (US); John S. McCoskey, Derwood, MD (US); Michael Asmussen, Herndon, VA (US)

(73) Assignee: Discovery Communications, Inc., Silver Spring, MD (US)

( * ) Notice: Subject to any disclaimer, the term of this patent is extended or adjusted under 35 U.S.C. 154(b) by 0 days.

(21) Appl. No.: 08/923,091

(22) Filed: Sep. 4, 1997

Related U.S. Application Data

(60) Provisional application No. 60/033,485, filed on Dec. 20, 1996, and provisional application No. 60/025,604, filed on Sep. 4, 1996.

(51) Int. Cl.[7] ............................. H04N 7/12; H04N 7/04
(52) U.S. Cl. ....................................... 725/105; 348/143
(58) Field of Search ................................. 348/211, 143; 386/95; 382/232; 364/514; 434/350; 725/105

(56) References Cited

U.S. PATENT DOCUMENTS

| 5,185,667 A | 2/1993 | Zimmermann |
| 5,313,306 A | 5/1994 | Kuban et al. |
| 5,359,363 A | 10/1994 | Kuban et al. |

(List continued on next page.)

FOREIGN PATENT DOCUMENTS

| EP | 0 702 491 A1 | 3/1996 |
| EP | 0 734 157 A2 | 9/1996 |
| EP | 0 821 522 A2 | 1/1998 |
| EP | 0 845 904 A2 | 6/1998 |
| WO | WO 94/07327 | 3/1994 |
| WO | 96/07269 | 3/1996 |
| WO | 96/08105 | 3/1996 |
| WO | WO 96/17306 | 6/1996 |
| WO | 96/18262 | 6/1996 |
| WO | 96/21173 | 7/1996 |
| WO | 96/21205 | 7/1996 |
| WO | 96/26610 | 8/1996 |
| WO | 96/26611 | 8/1996 |
| WO | WO 99/12349 | 3/1999 |

OTHER PUBLICATIONS

Stephen Hartley, et al. "Enhancing Teaching Using The Internet," Jun. 1996.

Murray W. Goldberg, et al., "World Wide Web—Course Tool: An Environment For Building WWW–Based Courses," M 1996, p.p. 1219–1231.

(List continued on next page.)

*Primary Examiner*—Chris Kelley
*Assistant Examiner*—Charles E Parsons
(74) *Attorney, Agent, or Firm*—Dorsey & Whitney LLP

(57) ABSTRACT

The present invention relates to a method and apparatus for communicating multiple live video feeds over the internet. Users may be able to view a plurality of remote locations in real time. In another embodiment of the invention, users are able to remotely control a video picture of a distant location. The remote control may be either actual control of a remote video camera or perceived remote control by the manipulation of audiovisual data streams. In one embodiment, text, graphics, and other video information supplement one or more video pictures to provide an educational and entertaining system. In accordance with the present invention, information is accessible to users who are viewing multiple video pictures. The information relates and describes what is being viewed. Users who have different types of equipment, with different data rates, are able to access and use the system of the present invention. In another embodiment, users may interactively communicate with a video lecturer by asking questions and receiving answers. The invention may be connected to, and in communication with, broadcast and/or cable television systems.

26 Claims, 25 Drawing Sheets

U.S. PATENT DOCUMENTS

| | | | | |
|---|---|---|---|---|
| 5,384,588 A | | 1/1995 | Martin et al. | 348/14.1 |
| 5,467,402 A | * | 11/1995 | Okuyama | 382/104 |
| 5,489,940 A | | 2/1996 | Richardson et al. | |
| 5,537,141 A | * | 7/1996 | Harper | 348/12 |
| 5,559,549 A | | 9/1996 | Hendricks et al. | |
| 5,600,368 A | * | 2/1997 | Matthews | 348/143 |
| 5,600,573 A | | 2/1997 | Hendricks et al. | |
| 5,703,965 A | * | 12/1997 | Fu | 382/232 |
| 5,729,471 A | * | 3/1998 | Jain | 364/514 |
| 5,764,276 A | | 6/1998 | Martin et al. | 725/146 |
| 5,793,414 A | | 8/1998 | Shaffer | 725/133 |
| 5,793,872 A | * | 8/1998 | Hirayama | 382/95 |
| 5,833,468 A | * | 11/1998 | Guy | 434/350 |
| 5,838,368 A | * | 11/1998 | Masunaga | |
| 5,877,801 A | | 3/1999 | Martin et al. | 348/36 |
| RE36,207 E | | 5/1999 | Zimmermann et al. | 348/207 |
| 5,903,319 A | | 5/1999 | Busko et al. | 348/607 |
| 6,052,717 A | | 4/2000 | Reynolds et al. | 709/218 |

OTHER PUBLICATIONS

Waite Group Press, "An Interactive Lesson In The Interactive Course Series," Online, 1996.

Terri L. Herron, "Teaching With The Internet," 1998, vol. 1, No. 3, p.p. 217–222.

Junichi Azuma, "Creating Educatioanl Web Sites," Mar. 1999, p.p. 109–113.

* cited by examiner

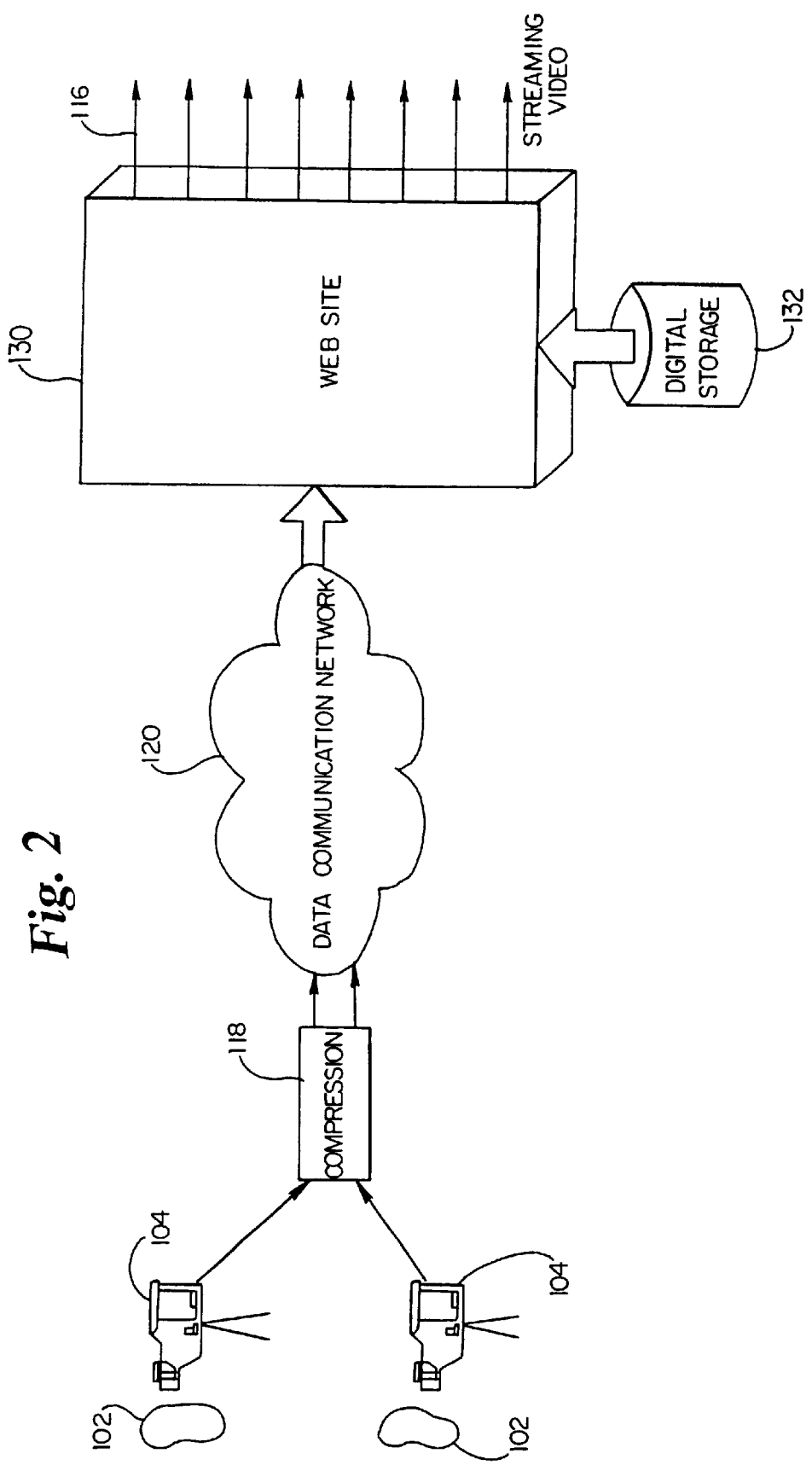

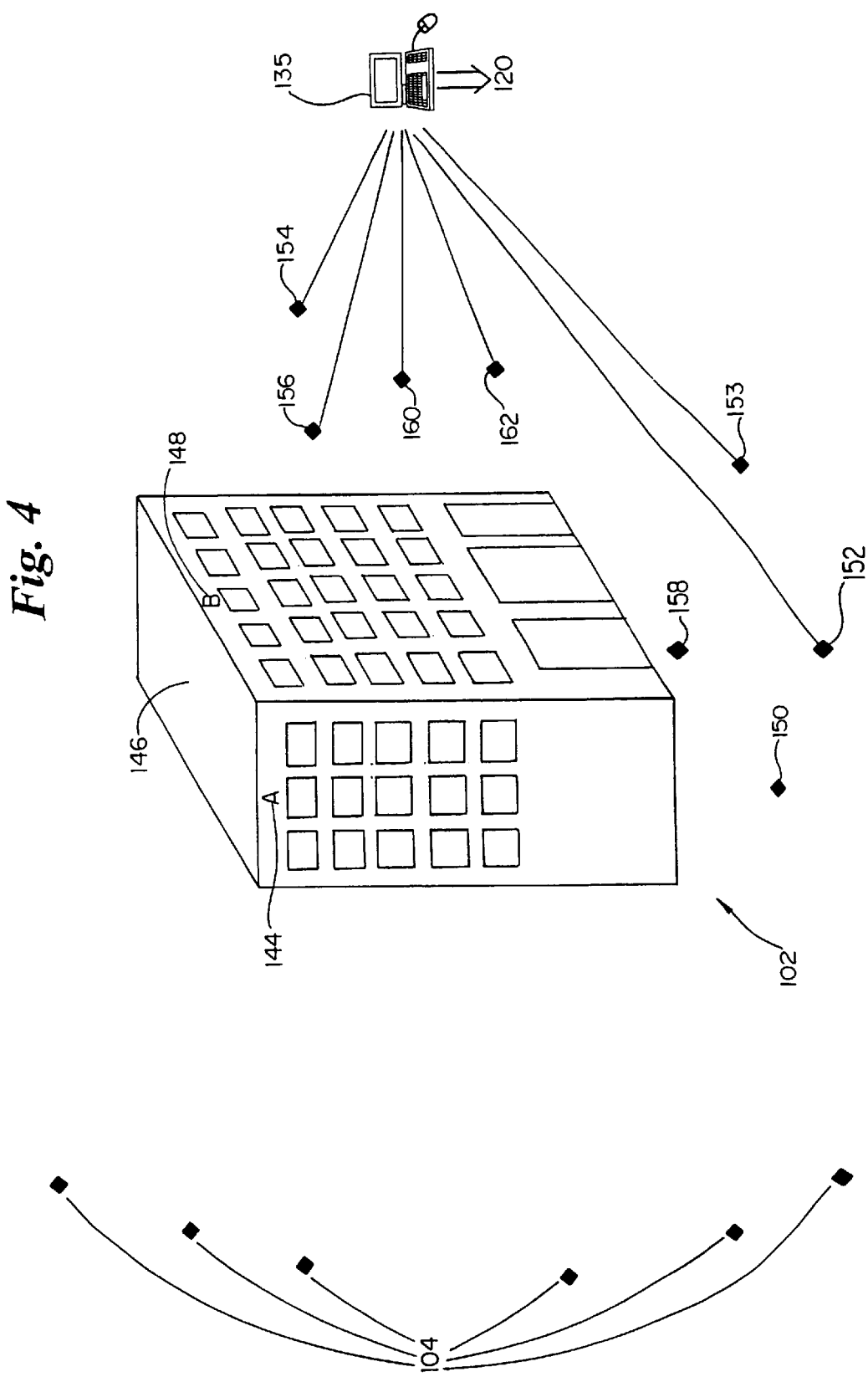

VIDEO CAMERA 150

VIDEO CAMERA 152

VIDEO CAMERA 153

VIDEO CAMERA 156

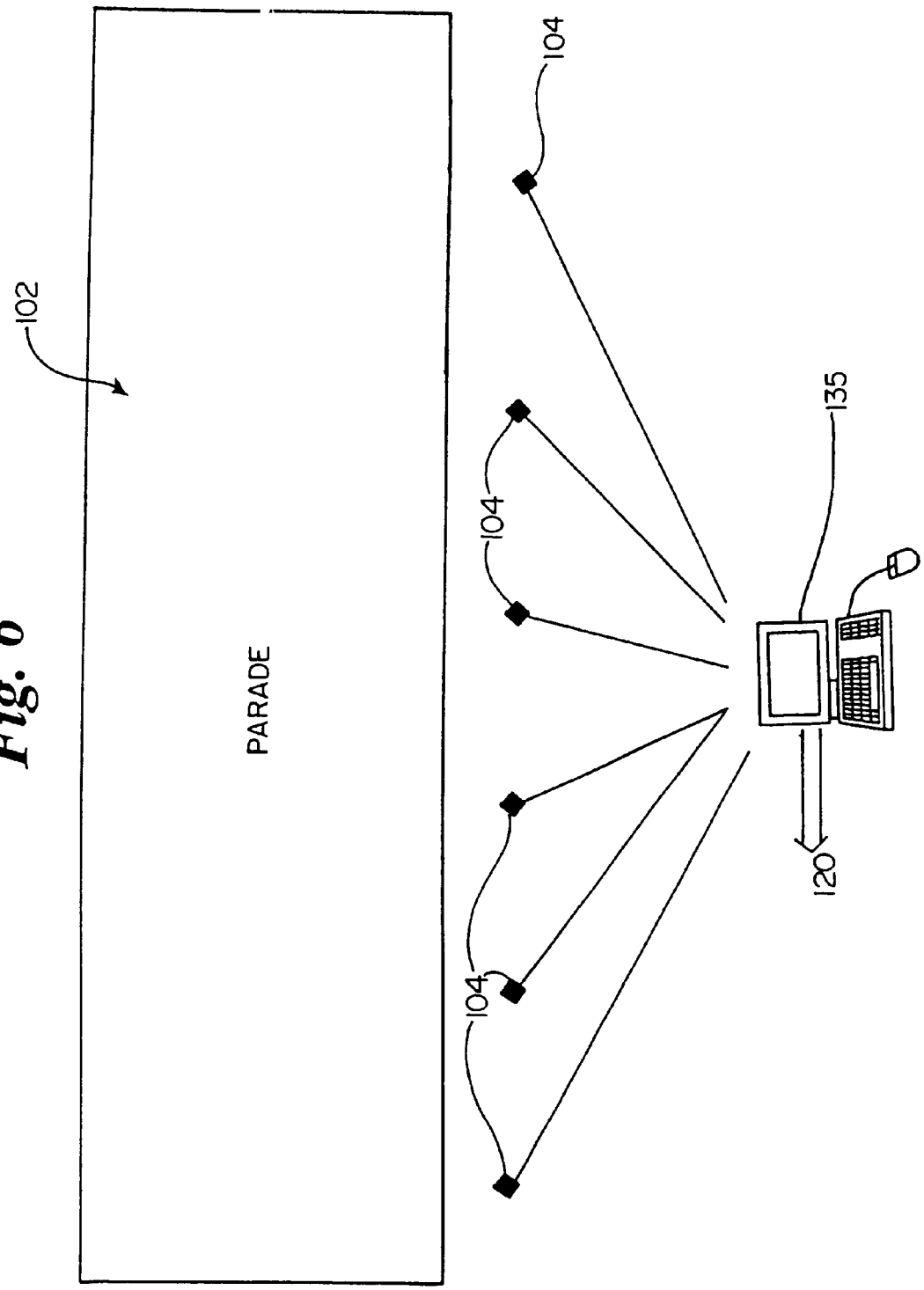

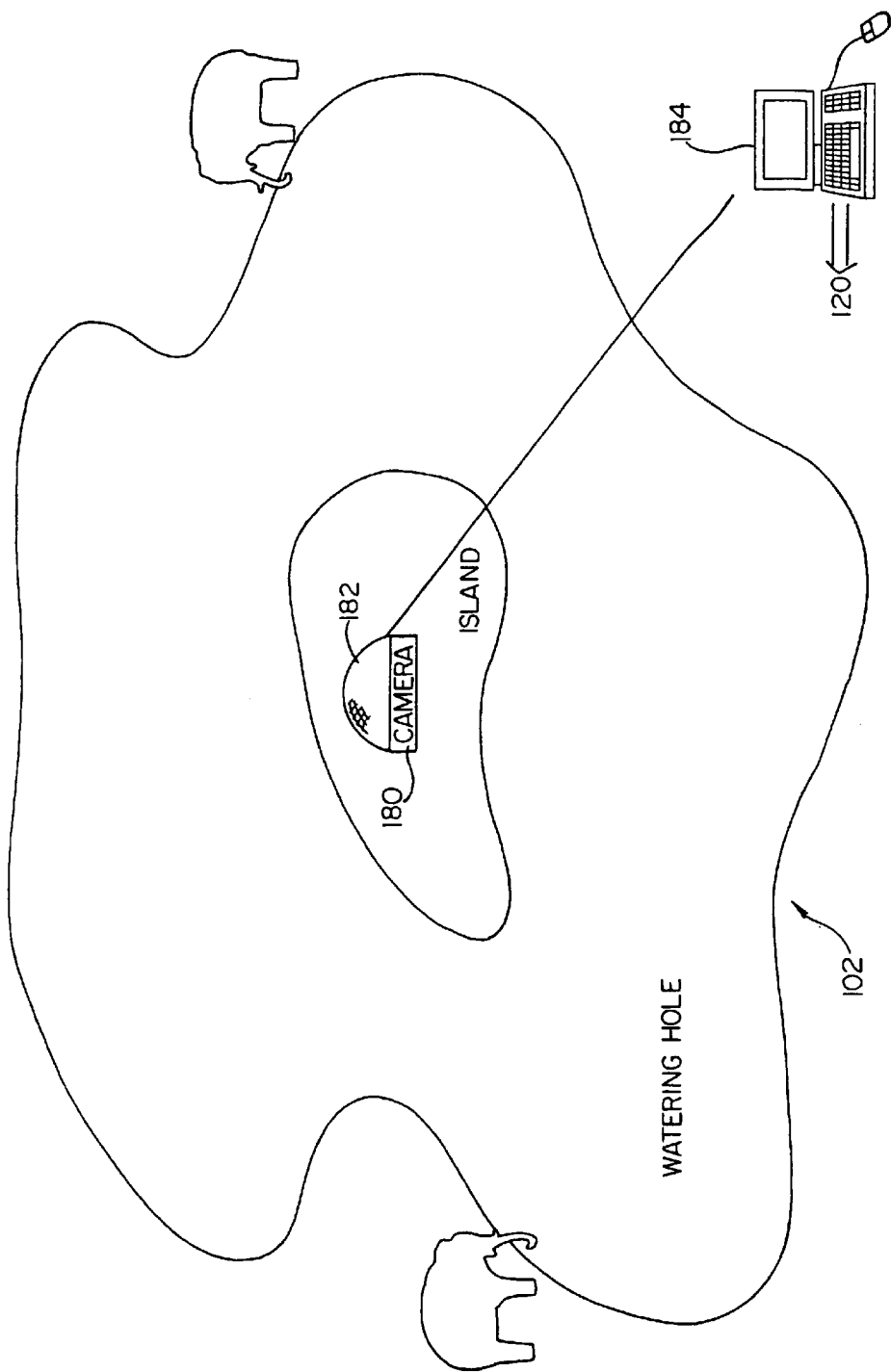

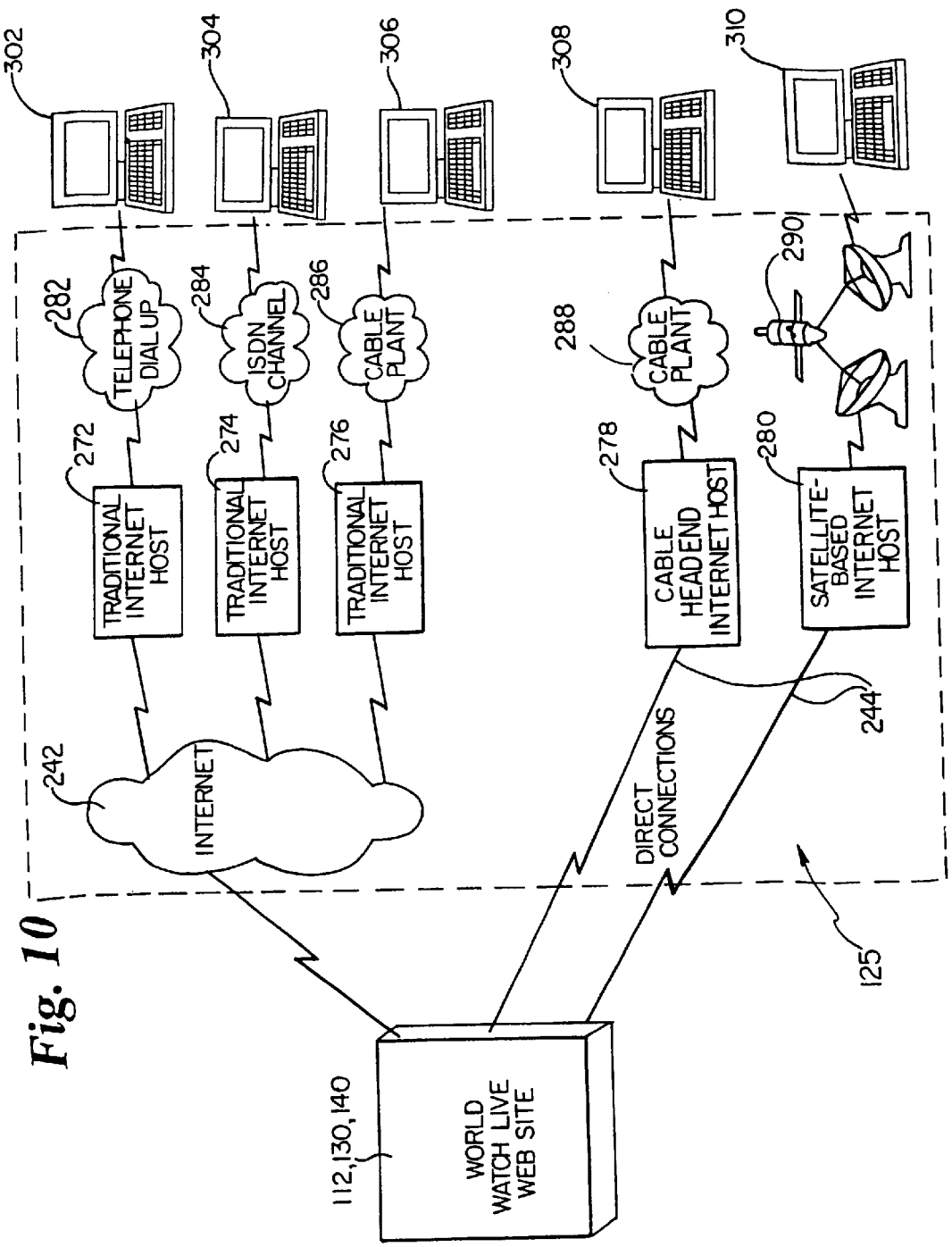

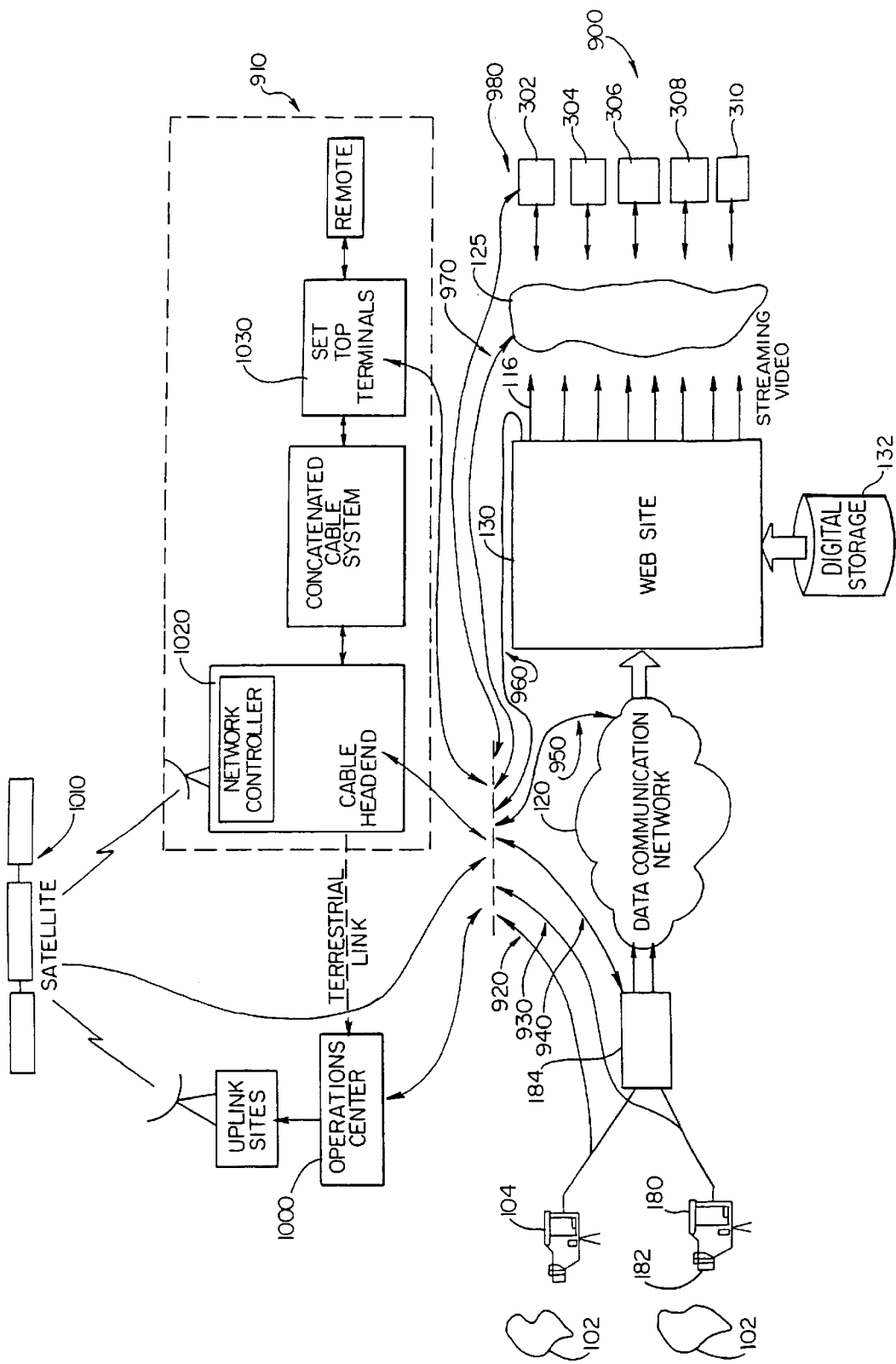

APPARATUS FOR VIDEO ACCESS AND CONTROL OVER COMPUTER NETWORK, INCLUDING IMAGE CORRECTION

CROSS-REFERENCE TO RELATED APPLICATIONS

This application claims priority based on U.S. Provisional Patent Application Serial No. 60/025,604, filed Sep. 4, 1996, entitled "Apparatus For Video Access And Control Over Computer Network", and this application claims priority based on U.S. Provisional Application Serial No. 60/033,485, filed Dec. 20, 1996, entitled "Apparatus For Video Access And Control Over Computer Network, Including Image Correction". Both provisional applications are incorporated by reference in their entirety.

INCORPORATION BY REFERENCE

Additionally, the following patents, patent applications and publications are incorporated herein by reference:

U.S. Pat. No. 5,559,549, issued Sep. 24, 1996 to Hendricks et al.,

U.S. Pat. No. 5,600,573, issued on Feb. 4, 1997 to Hendricks et al.,

U.S. pending patent application Ser. No. 08/352,205, filed Dec. 2, 1994, entitled NETWORK MANAGER FOR CABLE TELEVISION SYSTEM HEADENDS, now U.S. Pat. No. 6,201,536, U.S. Pat. No. 5,185,667, issued Feb. 9, 1993 to Zimmerman, U.S. Pat. No. 5,313,306, issued May 17, 1994 to Kuban et al., U.S. Pat. No. 5,359,363, issued Oct. 25, 1994 to Kuban et al., U.S. Pat. No. 5,384,588, issued Jan. 24, 1995 to Martin et al., U.S. Pat. No. 5,489,940, issued Feb. 6, 1996 to Richardson et al., PCT Publication No. WO 96/07269, published Mar. 7, 1996 by Jambhekar et al., PCT Publication No. WO 96/08105, published Mar. 14, 1996 by Labun, PCT Publication No. WO 96/18262, published Jun. 13, 1996 by Richardson et al., PCT Publication No. WO 96/21173, published Jul. 11, 1996 by Harris et al., and PCT Publication No. WO 96/21205, published Jul. 11, 1996 by Harris et al.

BACKGROUND OF THE INVENTION

This invention relates to the distribution of audiovisual signals through communications networks such as computer networks and servers. The invention has particular use with respect to global networks such as the internet and "World Wide Web". The invention also relates to education. Particularly, the invention provides an alternative to in-person classroom instruction.

1. Field of the Invention

The present invention relates to the fields of education, audiovisual systems, communications systems and computer networks.

Individuals from around the world exchange ideas and information with each other in order to learn more about other people, cultures, and the environment in which we live. Video and audio signals are commonly transmitted over broadcast communications media to provide viewers with news and entertainment. Computer networks are used for the remote exchange of data and other information. Broadly speaking, these systems are attempts to communicate useful knowledge between geographically separate individuals and institutions. The invention generally relates to improvements in the transmission of information between remote locations.

2. Description of Related Art

There is a constant desire to improve education and knowledge at all levels. It is thought that true human progress can only be achieved if people's understanding of each other is improved and if people's understanding of nature and the environment is improved. Traditionally, education and knowledge have been obtained in schools from classroom instruction and from the reading of books.

The disadvantage of current classroom instructional systems is that students must be physically present in the classroom to participate in the educational process. Therefore, students who are geographically displaced from the location of the classroom often cannot attend class instruction as often or as timely as students who are nearby to the classroom.

The disadvantage of textbooks is that they are often not kept current with recent events or technological changes. Textbooks are usually only updated on a yearly or less frequent basis, while important changes may occur monthly or more frequently. Also, to save funds, schools may not purchase new textbooks even though the textbooks have been updated. Therefore, the new knowledge, although available, is not communicated to students.

Recently, audiovisual presentations have begun to be used in the field of education. These systems may provide playback of a recording of a lecturer who provides a presentation on an educational topic. For example, students may learn about math from watching a videotape or television broadcast of a math professor's lecture. Education can also occur on a more informal basis. For example, specialty channels in the United States such as the Discovery Channel® and The Learning Channel® (headquartered in Bethesda, Md., U.S.A.) broadcast educational programming which both entertains and educates a diverse viewership.

The disadvantage of these audiovisual systems is that they are not interactive. Students are unable to ask questions, and the lecturer is unable to tailor the presentation of material to the specific needs of the current student audience. Consequently, the needs of the students are not met.

Cable and broadcast television are commonly known media which supply information to large numbers of viewers equipped with receivers known as "television sets." By receiving a broadcast, cablecast or satellite signal, users are able to view scenes from remote locations and observe newsworthy events which occur far from the user's location. However, conventional television is a one-way media in which users cannot communicate with each other or the broadcaster.

Recently, the advent of the "internet," and "World Wide Web," in conjunction with the proliferation of personal computers, has allowed people to exchange information and ideas on a global and inexpensive basis. Generally speaking, the internet is a large computer network which connects "host" computers. Users with a computer, modem and telephone line commonly call via telephone to connect with a "host." The "host," being in communication with other hosts (connected to other users) is able to transfer information between users. The internet is used, for example, to transfer, data files, still images, sounds and messages between virtually any two points in the world with telephone access.

The use of the internet has increased dramatically since 1981, when approximately 300 host computers were linked together. It has been estimated that in 1989, the number of linked host computers was fewer than 90,000; but by 1993, over a million host computers were connected. Currently over 9.4 million host computers are linked (not including the personal computers people use to access these hosts via modems) and as many as 40 million people around the world may have access to the internet medium. This number is expected to grow to 200 million by the year 1999.

Users on the internet are able to transfer text, graphics, and still pictures between remote locations. Other types of information which can be transmitted include files containing prerecorded sequences of images. To view these images, users download a large data file, and after running appropriate software, see a sequence of images on the computer screen. These images are not provided in real time, and are not viewable while the user is accessing the internet.

Therefore, even though the internet is a two-way communication medium, it is not currently being utilized to provide video information and audiovisual presentations. This is a disadvantage, in that a large number of people have been accustomed to television audiovisual presentations, and prefer an audio-video presentation to a textual or graphical presentation.

What is needed is a medium of communication that is interactive and which carries audio, video, text, and graphics.

What is needed is an educational system which is user friendly and entertaining.

What is needed is to improve the internet such that users can access many audiovisual programs.

What is needed is to provide users with live video from remote sites.

What is needed is a remote video system with increased realism and accuracy, such that users feel as though they were actually present at the remote location.

SUMMARY OF THE INVENTION

In accordance with the present invention, video is collected at a remote site. (The term "video", as used herein, includes stereophonic or monophonic audio signals which may accompany a video signal. Additionally, "video" is used broadly herein to include still images, groups of related still images, animation, graphics, pictures, or other visual data.) The remote video information may be obtained from a video cassette, CD ROMs, television channels, one or more video cameras, or other well known sources. If video cameras are used, they may be connected to a computer so that they are remotely controllable, or they may be oriented such that a perception of control can be created for users. The video may relate to remote sites of interest, such as a pyramid in Egypt, or the images may relate to an educational lecture being conducted at a remote site.

The collected video is transferred to a web site, either in compressed or uncompressed form. The video may be physically transported or may be transmitted through a communications medium to the web site.

The web site contains a storage media which may store some or all of the video. Additionally, the web site passes camera control commands, if applicable, to the remotely controlled cameras or may simulate the remote control of a camera. The main function of the web site is to pass video to a plurality of users, through a communication media such as the internet, in response to user selections. The video passed to the plurality of users may be live video being fed to the web site, or may be stored video. A number of video servers are used to output the video to the users through the communications media, such as the internet. The video may be tailored by the web site for the particular user's hardware, including data communication equipment, or memory size, etc . . . , i.e. the data rate matches the highest speed which the user's equipment can handle.

Users receive and display the video sent from the web site. Many simultaneous video pictures may be received. Of course, the quality and frame rate of the video is dependent on the user's communications hardware. Users with high-speed modems or cable modems receive higher quality video. The users are able to send commands and/or queries to the web site. The commands and queries are forwarded to remote locations to control remote cameras or query remotely located instructors. Alternatively, the commands cause the web site to change from among many video signals with different camera angles or locations (or to transmit a different portion of a wide angle image), causing the user to have a perception of remote camera control. The user's commands may also cause a different portion of a received wide angle image to be displayed, giving the user a perception of camera control.

In addition to video, the web site provides information, such as graphics and text, which is related to the video. This information may be automatically supplied, or provided upon user request. Therefore, the user is provided with a comprehensive set of information concerning remote sites, enabling the user to be quickly educated about the remote site of interest.

BRIEF DESCRIPTION OF THE DRAWINGS

FIG. 2 is a block diagram of an embodiment of the invention where remote video is provided by remotely located cameras and a communication network carries the video to the web server.

FIG. 4 shows remote cameras positioned around a building for perceived camera control.

FIG. 6 shows remote cameras deployed to follow a parade route.

FIGS. 8A and 8B show a single remote camera at a remote location, where the camera has a 180 degree spherical (or other wide angle) lens.

FIG. 10 is a block diagram of communications paths from the server site to remote users.

FIG. 21 is a diagram showing the interaction between a computer network embodiment of the present invention and a cable television system.

DETAILED DESCRIPTION OF THE DRAWINGS

As stated previously, the present invention is related to obtaining video from remote sites and interactively presenting that video to users. The video is obtained at a remote site, communicated to a web site (where it may be stored), and forwarded to users.

1. Obtaining Video From Remote Sites, Communicating the Video to a Web Site, and Streaming the Video To Users.

Figure 1:
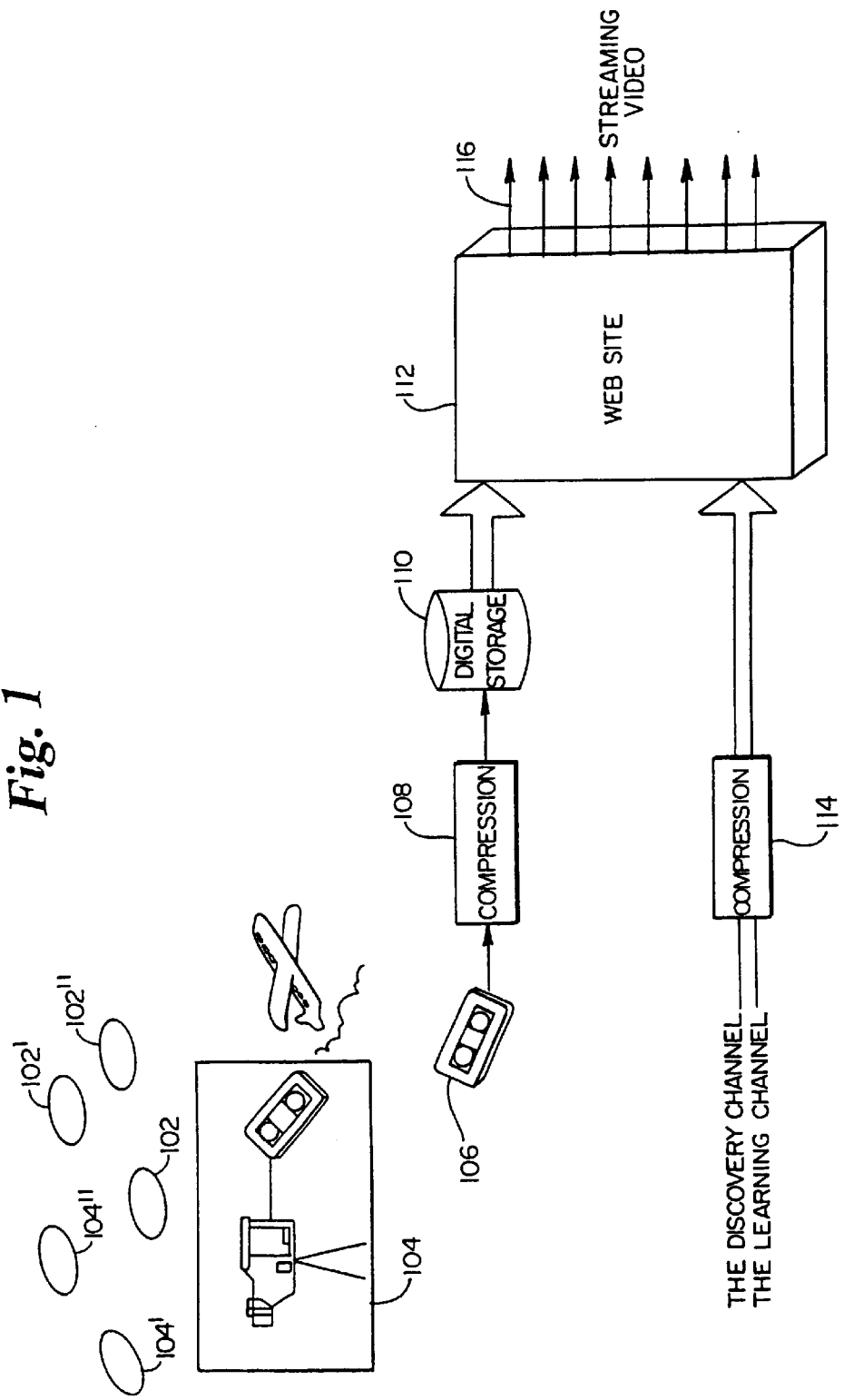
FIG. 1 is a block diagram of an embodiment of the invention where remote video is provided to a web server by videocassette and by ordinary television.

FIG. 1 shows a preferred embodiment of the invention where remote video sources are videocassette and television programs. FIG. 1 shows remote sites 102, remote cameras 104, videocassette 106, compression devices 108, 114, digital storage device 110 and web site 112. As shown in FIG. 1, a video camera 104 is used to film activity at remote site 102. As discussed below, numerous video cameras at a single remote site may be used to obtain different views and audio (preferably stereophonic) of the remote site from different angles and orientations. Also, numerous remote sites, each with its own video camera, may used as shown at 102', 102" and 104' and 104". The video cameras film events at the remote sites, and record the events on videocassette 106 or other suitable media.

The recorded information is then transported to a web site 112, or to a site in communication with web site 112. As shown in FIG. 1, the recorded information from video tape 106 is then compressed in compression unit 108 and stored in digital storage media 110. Many compression algorithms may be used, such as MPEG-1, MPEG-2 and Wavelet. Compression systems currently available from The Duck Corp, Xing Technology Corp., Indeo, Digital Video Arts, Ltd., VDOnet Corp. and Intel Corp., may be used with the system. The digital storage media may be any known storage device, such as a hard disk, CD ROM, digital video disc (DVD), digital tape, video file server or other media.

The stored and compressed audio/video is then provided on a number of streamed audio-video outputs 116 from the web site 112. This enables many users to access the stored video and audio, and allows for one user to receive numerous audio-video signals, i.e. split the display into numerous "camera" feeds.

In addition to providing streamed audio and video from videocassette, the web site 112 may provide audio and video from television channels. The television signals are received by a conventional television receiver (not shown), and digitally compressed by the compression unit 114 and fed through the web site 112 to the streamed output. It is not normally necessary to store the television programs in a digital storage unit (such as the storage unit 110), since the audio and video is constantly incoming and changing. However, certain segments of broadcast television may be stored in a storage device (not shown) for recall by a user.

FIG. 2 shows another embodiment of the invention where similar reference numerals indicate items that correspond to the items shown in FIG. 1. The system of FIG. 2 uses remote cameras and a communication network to provide remote video to the web site. FIG. 2 shows remote sites 102, video cameras 104, compression unit 118, data communication network 120, web site 130, digital storage unit 132, and streamed video 116.

As shown in FIG. 2, remote sites 102 are filmed by cameras 104 (as in FIG. 1). However, in this embodiment, the output of the cameras 104 pass through a compression unit 118. The compressed audio and video is communicated over data communication network 120 to web site 130. The data communication network 120 may be any network currently known to one of ordinary skill in the art, such as land-leased lines, satellite, fiber optic cable, microwave link or any other suitable network.

Other suitable networks may be cellular networks or paging networks. In a paging network, cameras 104 may be connected to a paging device and/or digital storage media or paging transmitter for communication of the video (including still images) to the web site 130. The following publications, hereby incorporated by reference, disclose relevant systems: PCT Publication No. WO 96/07269, published Mar. 7, 1996 by Jambhekar et al.; PCT Publication No. WO 96/21173, published Jul. 11, 1996 by Harris et al.; PCT Publication No. WO 96/21205, published Jul. 11, 1996 by Harris et al.

The web site 130 in this example is adapted to receive information from the data communication network 120. The web site may pass the video from cameras 104 to users at streamed video outputs 116. In alternative embodiments, the web site may contain a decompressor to decompress the video prior to streaming it to users, or change the compression scheme of the video to one which is compatible with the connected user. Alternatively, the video may be compressed at the streamed video output and users who connect to the web site 130 may run decompression software. The web site 130 may store the audio and video received over data communication network 120 in digital storage unit 132 before providing it to the streamed outputs 116. Alternatively, the audio and video may be directly passed to the streamed outputs 116.

Figure 3A:
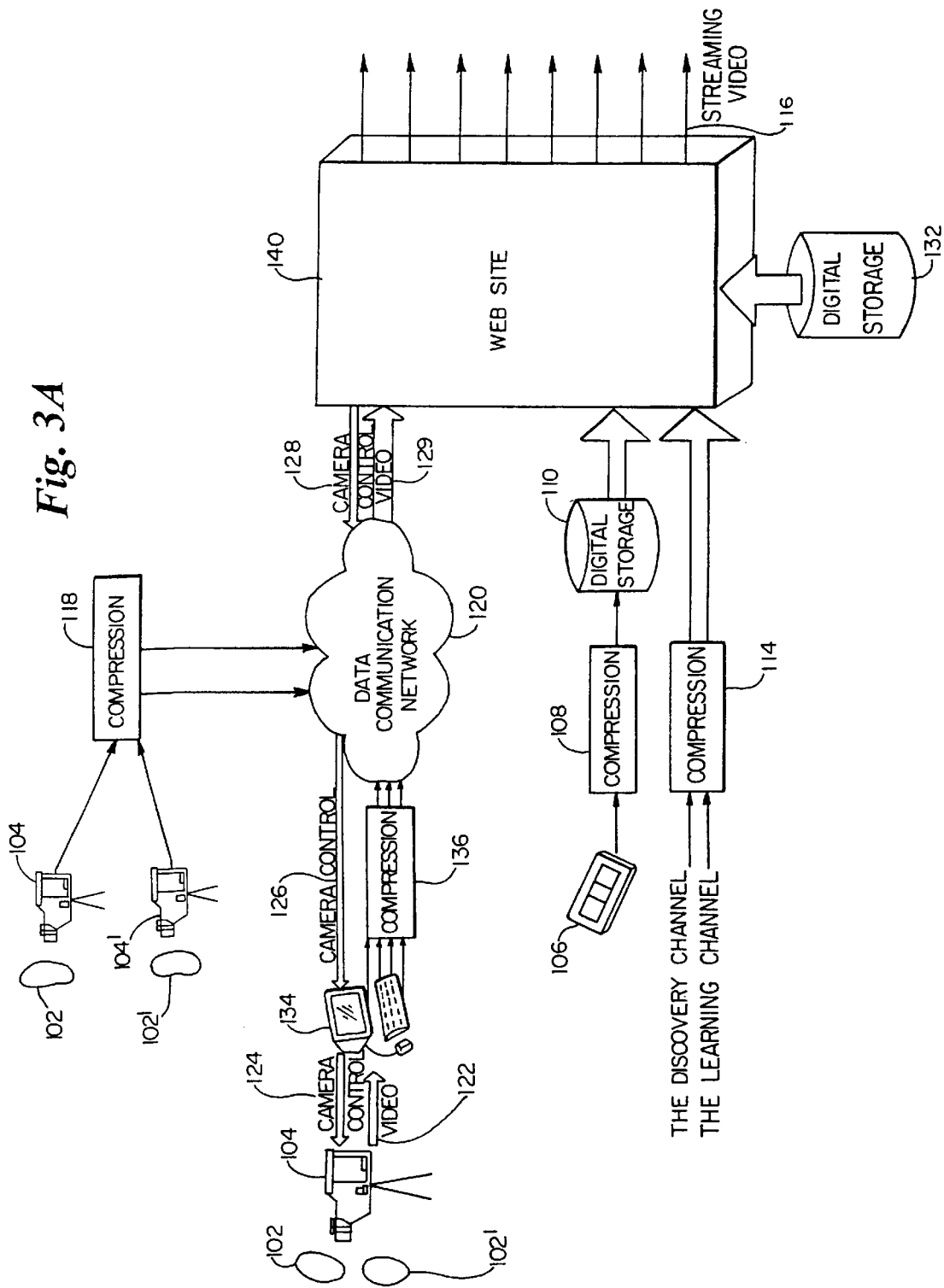
FIGS. 3A and 3B are a block diagrams of an embodiment of the invention using the embodiments of FIGS. 1 and 2 with remotely controllable cameras.

FIG. 3A shows another embodiment of the invention that combines the embodiments of FIGS. 1 and 2 and adds remote camera control. FIG. 3A shows remote sites 102, cameras 104, computer 134, video path 122, 129, control path 124, 126, 128, compressors 108, 114, 118, 136 data communication network 120, web site 140, digital storage means 132, and streamed video 116. As with FIGS. 1 and 2, remote sites 102 are filmed by camera 104. As with FIG. 1, the web site 140 is able to receive video tape 106, compress the audio and video in compression unit 108, and store the compressed audio and video 110. Audio and video from television stations may also be compressed by compression unit 114 and stored or passed as streamed video 116, as in FIG. 1.

Likewise, the cameras 104 may be connected to compression unit 118 (as in FIG. 2) and communicate compressed audio and video to web site 140 via data communication network 120. Thus the functions performed by the embodiments shown in FIGS. 1 and 2 may be combined in a variety of manners at a single web site 140.

Figure 3B:
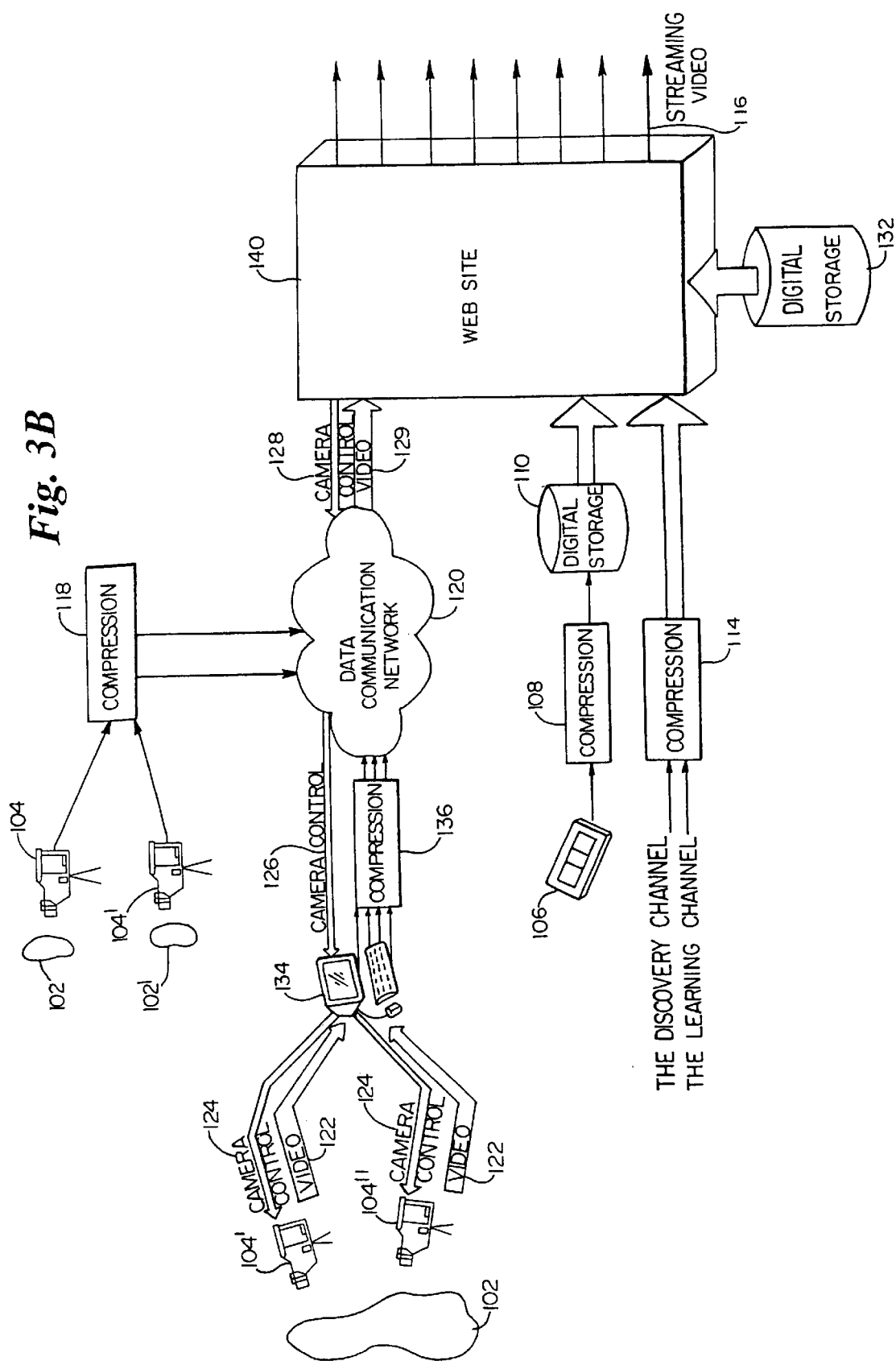

FIGS. 3A and 3B add the additional feature of camera control to the previously described embodiments. As shown in FIG. 3A, a computer 134 is connected to remote camera 104. The computer is able to control a mechanical or electrical device on the camera 104, to alter the camera's orientation (including position and/or angle). Audio and video from the camera 104 passes to the, computer 134. The video may be processed and stored in the computer. Preferably, as shown in FIG. 3B, the computer is connected to multiple remote cameras 104' and 104" so that multiple users may each control a camera. The computer 134 may either contain a compressor or be connected to an external compression unit 136. The video from cameras 104' and 104" is compressed and provided to data communications network 120. This compressed video is subsequently received by web site 140. The remote cameras 104', 104" (FIG. 3B) may be controlled by control signals passed from computer 134 on path 124. The control signals are received by computer 134 from the data communications network 120 over the camera control path 126. The web site 140 provides the control information to the data communications network 120 over path 128. The web site 140 of this example is adapted to pass control signals to cameras 104 and to store video images in a digital storage means 132. The web site provides a number of streamed video outputs 116 as in the other examples.

This embodiment allows remote users to control the angle or orientation of cameras 104', 104". Users are connected to the web site 140 and receive the streamed video 116 from the cameras 104', 104". If the users wish to move the camera 104', 104" to the right, they may enter a user command (such as "pan right") at their terminal. The command is received by the web site 140, and formatted, if necessary. The command is outputted to the data communication network 120 as a control signal through the camera control path 128. The remote computer 134 receives the camera control signals from the communication network 120 over camera control path 126. The remote computer 134 may be adapted to control multiple cameras at multiple locations 102, or multiple cameras at the same location 102.

The computer 134 is connected to the remote camera 104 by a camera control path 124. This path allows control commands from the computer to travel to the cameras 104', 104" and control the cameras 104', 104". The cameras 104', 104" may have computer-controlled swivel motors (not shown) for panning left and right, may have a computer-controlled pivot motor (not shown) for panning up and down, and may have a computer-controlled motor (not shown) for moving a zoom lens. These motors are known to the artisan and are currently available. A plurality of cameras may be provided at a single site to allow multiple users to have camera control at the same time.

This system of obtaining and/or storing video at a web site is extremely flexible. The system allows for perceived camera control by multiple cameras, actual camera control of one or more cameras, perceived camera control via a wide-angle lens on a single camera, and for the generation of comprehensive interactive programs.

2. Perceived Camera Control With Multiple Cameras.

In one alternative embodiment, shown more clearly in FIGS. 4–6, users are given the perception of camera control. To achieve this, a plurality of fixed cameras 104, 150, 152, 153, 154, 156, 158, 160, 162 (FIG. 4) are disposed around a remote site 102. In accordance with this embodiment, it appears to users that they are controlling the angle or position of a camera when in actuality they are merely being transferred to the video output of a different camera. FIGS. 4–6 show this concept in greater detail.

As shown in FIG. 4, a building 146 is being prepared for demolition. Disposed around the building 146 are cameras 104, 150, 152, 153, 154, 156, 158, 160, 162, connected to a computer 135. The computer 135 is connected to a communication network 120 (not shown). The video from cameras 104, 150, 152, 153, 154, 156, 158, 160, 162 is digitized and preferably compressed prior to communication over network 120, either by compressors connected to the cameras (not shown) or by a compressor connected to the computer 135 (not shown). The cameras may be digital cameras or analog cameras connected to an analog-to-digital converter.

The cameras specifically identified around the periphery are cameras 150, 152, 153, 154, 156, 158, 160, and 162. For reference, the building contains the letter "A" and the letter "B" on two sides as shown at 144 and 148 in FIGS. 4 and 5. A number of additional cameras 104 are disposed about the periphery of the building in a circular pattern. The pattern and number of cameras are not critical, but will control how the user perceives movement of the "camera".

Referring to FIG. 4, a video camera 150 faces side A, a video camera 152 is between sides A and B, a video camera 153 faces side B and a video camera 154 is between side B and the side opposite side A. The video cameras 156, 158, 160 and 162 are disposed closer to the building, as shown. All the video cameras contain audio pickups (preferably stereo). Additionally, all the video cameras are connected to a computer 135 which outputs compressed audiovisual signals to the communication network 120 and consequently to the web site. The system shown in FIG. 4 may be implemented by the systems shown in either FIG. 2 or FIG. 3. Any number of users in communication with the web site 130, 140 may receive the audio and video from these cameras.

Figure 5A:
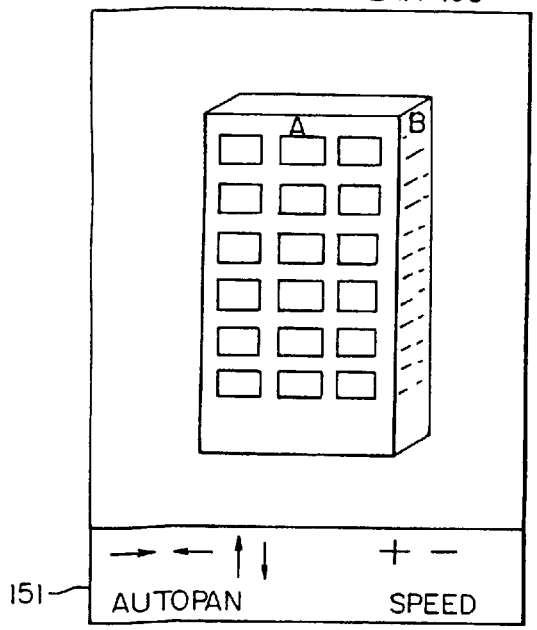
FIGS. 5A, 5B, 5C, and 5D show video images from specific cameras shown in FIG. 4.
Figure 5B:
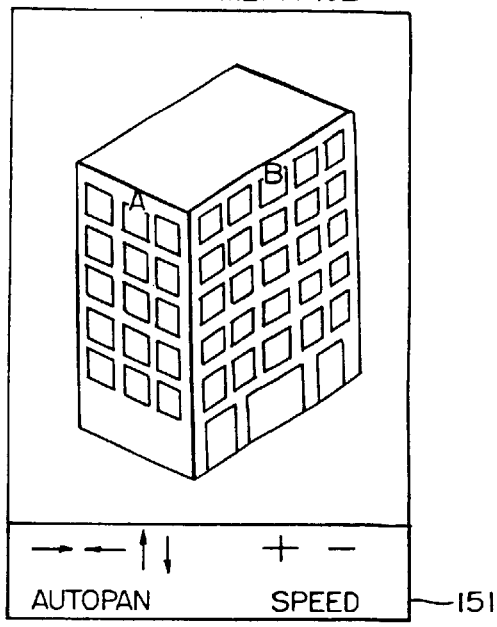
Figure 5C:
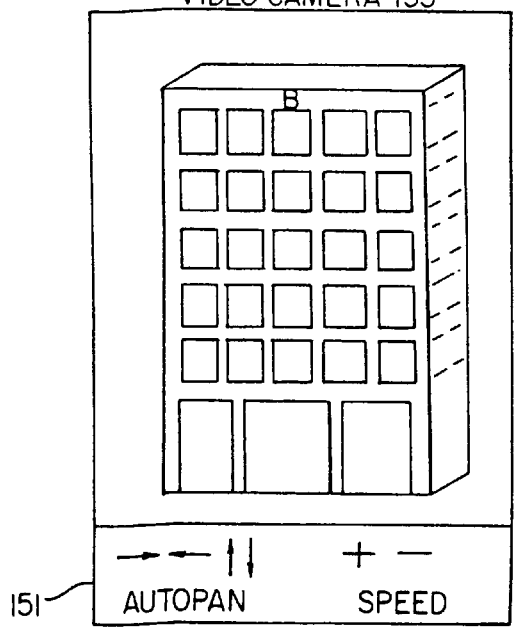

FIG. 5A shows a typical screen view 150 of the video presented to remote users who are connected to the web site of the present invention. As shown, the user is observing live video from camera 150, which provides a view of the building on side A. A "toolbar" of commands 151 is presented to the user, including a pan left command "←", a pan right command "→", a pan up command "↑" and a pan down command "↓". An "autopan" command is used in conjunction with another command (such as pan right). The "autopan" command is used to automatically move the picture position in the direction previously entered. For example, if "autopan" is entered after "pan right," then the picture will keep panning right until another key is pressed or a default key (such as the ESCape key) is pressed. The speed of the "autopan" function is controlled by the "speed" command, which is used in conjunction with the "+" and "−" commands. Additionally, the "+" and "−" commands, when used alone, control a "zoom-in" and "zoom-out" function, respectively. The "toolbar" commands are selected via a user input device, which may be a keyboard, mouse, trackball, remote control, etc . . .

When any user wishes to switch from the view of the camera 150 (FIG. 5A) and pan to the right, the user initiates a pan right command "→", which is transmitted to the web site 130, 140 (FIGS. 2 and 3). The web site receives the command, and in response, causes the video from the camera positioned to the right of the camera 150, in this case the video camera 152 (FIG. 4) to be transmitted to the user. The user then observes the picture appearing in FIG. 5B, which appears to be a view to the right from the previous position (camera 150). If the user continues to pan right, he is presented with the FIG. 5C view, received from the camera 153. The user may continue to pan right all away around the building in this manner.

Figure 5D:
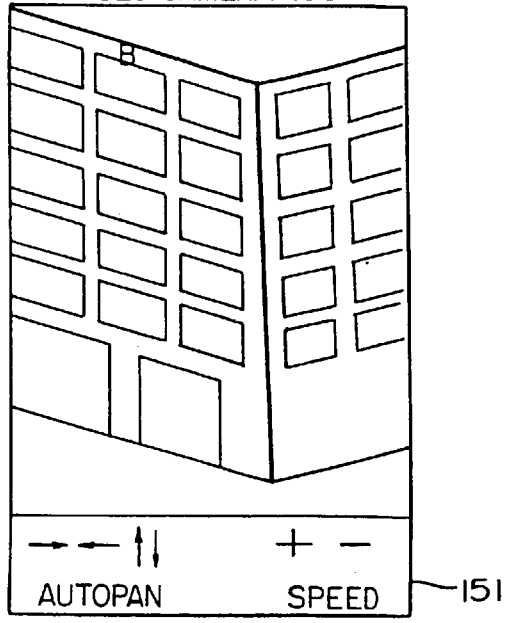

Additionally the user has special functions available, such as "autopan" and "zoom." For example, "autopan" in conjunction with "pan right" would cause the view of the building to rotate, at a speed dictated by the "speed" function and the "+" and "−" keys. Using the "+" and "−" keys alone causes the view to change to a closer camera ("+") or a camera further away ("−"). As shown in FIG. 4, the cameras 156, 158, 160 and 162 are disposed closer to the building than cameras 150, 152, 153 and 154. A "magnified" image, obtained from the camera 156, is shown in FIG. 5D. If no cameras are disposed closer or further away, digital image processing may be used to digitally increase or reduce the size of the image. The software which controls these functions may be disposed either at the web server or on the user's computer.

Thus, users may obtain different views of the building 146 as if they were remotely controlling the positioning of a single remote camera. The users may observe the demolition of the building from many exciting perspectives. This "perceived" camera control is advantageous because it allows any number of users to "control" a camera. A single camera which is remotely controllable is only controllable by a single user. Thus, the present invention is suitable for large audiences. The realism of this perceived control is directly dependent upon the number of cameras and their distances from the viewed object.

Therefore, when the building 146 is demolished, any number of users may pan around the building in real time as if they were actually present at the site. When the building is demolished, the video cameras pick up, preferably in stereo, the sounds of the demolition. Users who have loudspeakers connected to their computer may experience the demolition almost as if they were present.

FIG. 6 shows a deployment of a number of cameras 104 which are arranged in a linear fashion around a point of interest, each camera connected to computer 135 as in FIG. 4. As with FIGS. 4–5, this embodiment uses "perceived" camera control which may be achieved by the systems shown in FIGS. 2 or 3. In this example, the remote location and point of interest is a parade, such as a New Year's Day Parade. With the camera deployment shown, a user may traverse the length of the parade without actually being present. Users may view whichever part of the parade they are interested in, for as long as they desire, without worry that they have missed an interesting band or float. In this example, the camera deployment merely follows the parade route. Parents who have children in a band or float may search for the child and follow the child throughout the parade route, rather than having to monitor every moment of the parade on television in the hopes that the child will pass the reviewing camera when the parents are watching. The parents merely "move" from different cameras along the parade route as their children progress in the parade.

3. Actual Camera Control of Single/Multiple Cameras.

Figure 7A:
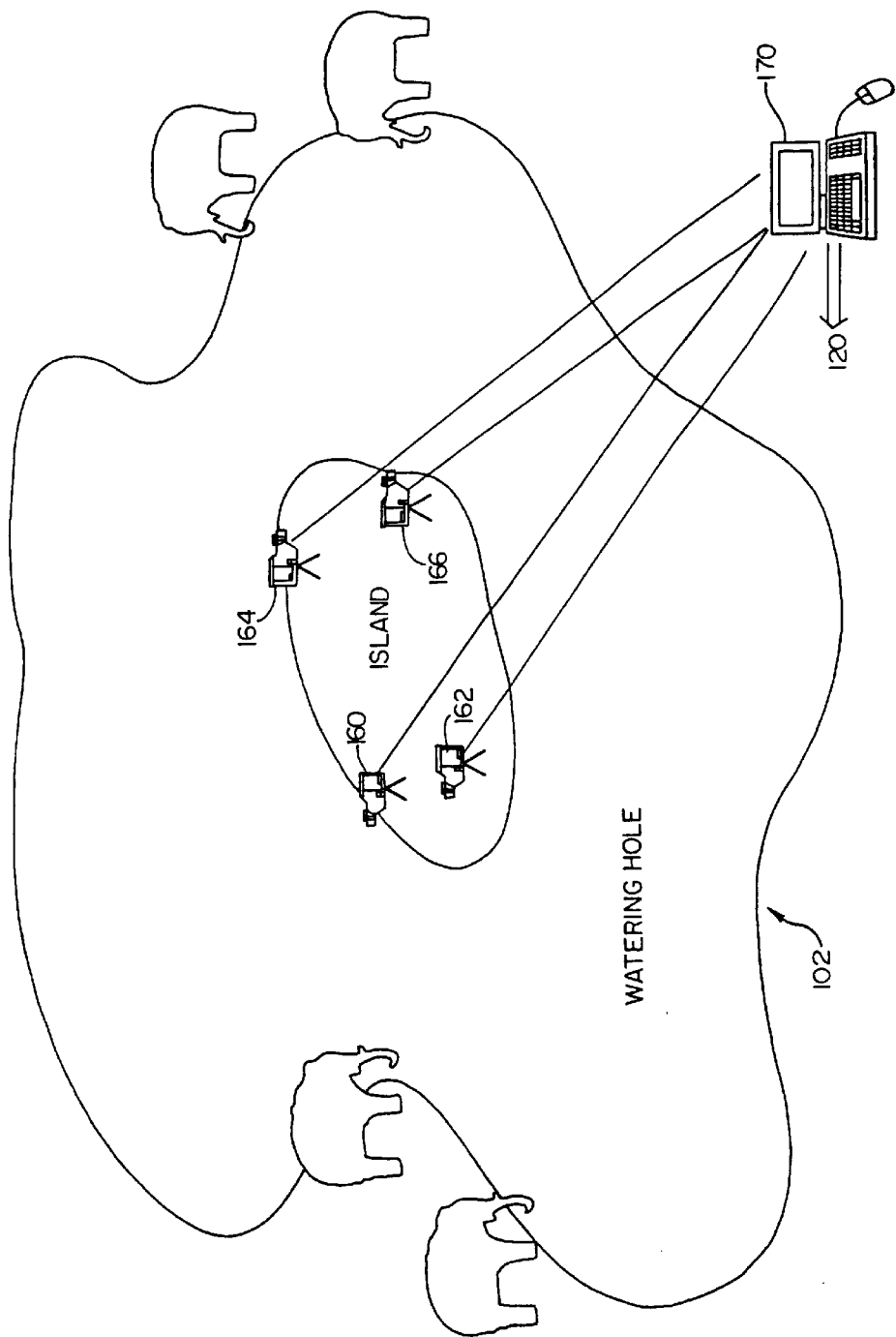
FIGS. 7A and 7B show remotely controlled cameras at a remote location.
Figure 7B:
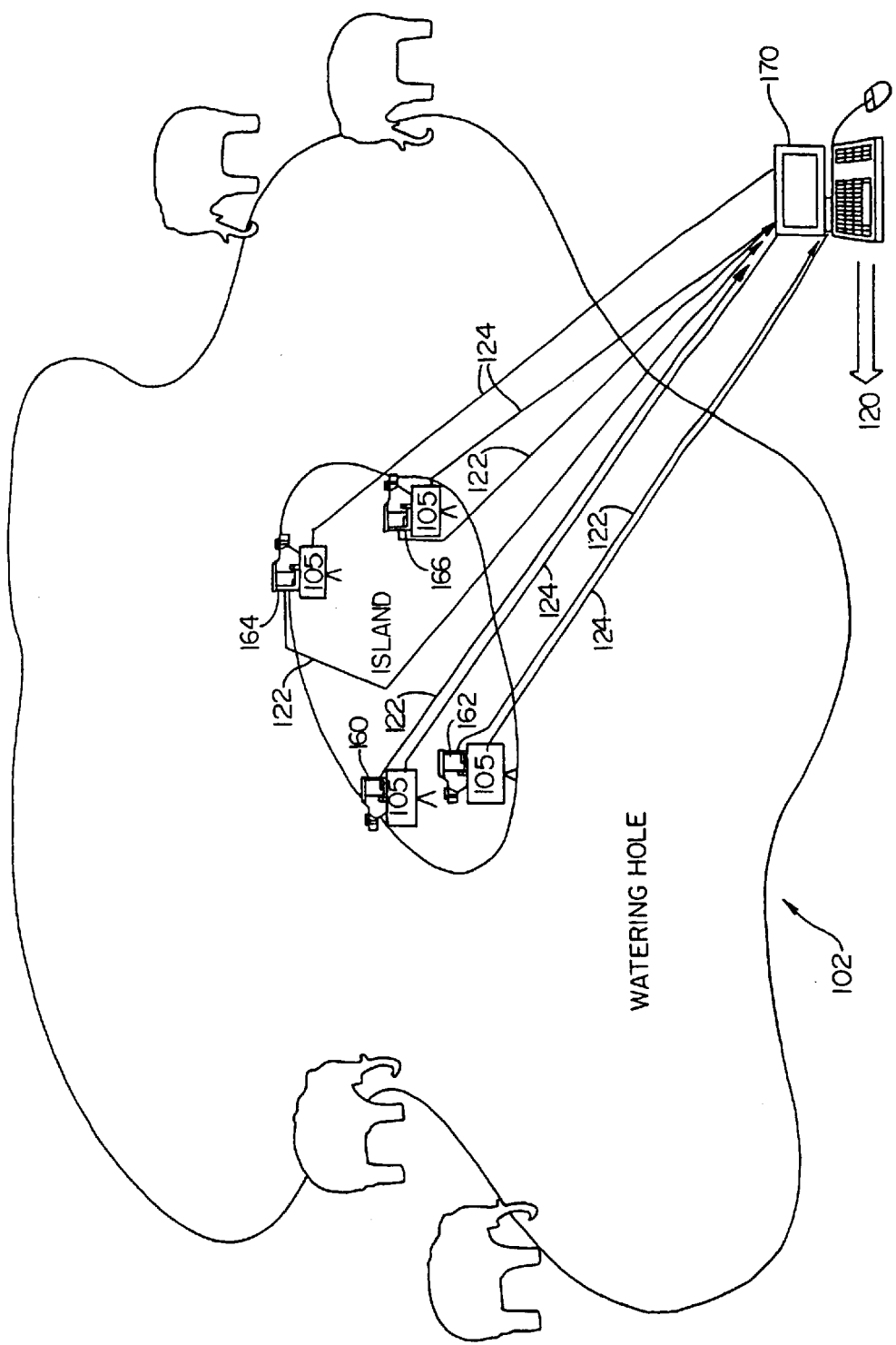

FIGS. 7A and 7B show another embodiment, where a number of cameras 160, 162, 164, 166, are provided. These cameras are in direct communication with and are controlled by computer 170. Although it is possible to form a ring of cameras to perform "perceived" camera control (as in FIGS. 4–6), the embodiment shown uses four cameras 160, 162, 164, 166 which contain motors 105 (FIG. 7B) for controlling the camera's positioning. The motors are controlled by computer 170. Either a single computer 170 or a number of computers 170 may be used. The remote location and point of interest shown in FIGS. 7A and 7B are, for example, a watering hole or desert oasis. Users who access the web site 140 are able to observe live video of wildlife behavior at the watering hole. The cameras 160, 162, 164, 166 are disposed at an island in the middle of the watering hole. The toolbar 151 of FIG. 5 is also used in this embodiment and enables users to choose camera control commands to spin the cameras around or perform other camera functions, such as zoom. Users are therefore able to receive different views and angles, and observe the entire watering hole.

FIG. 7B shows the control and video paths of the FIG. 7A system combined with system shown in FIGS. 3A and 3B. The video from cameras 160, 162, 164, 166 is communicated to computer 170, in compressed or uncompressed form on path 122. The computer 170 communicates the video to communications network 120 for reception by the web site 140 (FIGS. 3A, 3B). Preferably the video is digitized and compressed by either the cameras 160, 162, 164, 166, the computer 170, or an external analog-to-digital converter (not shown) and compressor 136 (FIGS. 3A, 3B) prior to transfer to the communications network 120.

Camera control commands are received by the computer 170 on control line 126, as shown in FIGS. 3A, 3B and 7B. The commands are formatted, if necessary, by computer 170 and transferred to control units 105 attached to cameras 160, 162, 164, 166. The control units 105 are connected to spin, zoom, or otherwise control the cameras as directed by the user.

Communications links 124 and 122 may be wired, wireless, digital or analog, and computer 170 may be located nearby or remote from the site 102.

The system of FIGS. 7A and 7B are unlike the embodiments shown in FIGS. 4–6, because each user is assigned a remote camera in the FIGS. 7A, 7B embodiment. Since each user must be assigned their own controllable camera, users will have to contend for available cameras. The number of controllable cameras may range from a single camera to any number, and is preferably statistically determined to correlate to the average number of users who access the web server 140 at any given time or at peak times. The number of cameras may be reduced by using known systems which utilize queuing, reservations, and time limits.

4. Perceived Camera Control Using A Single Camera And A Wide-Angle Lens.

Figure 8B:
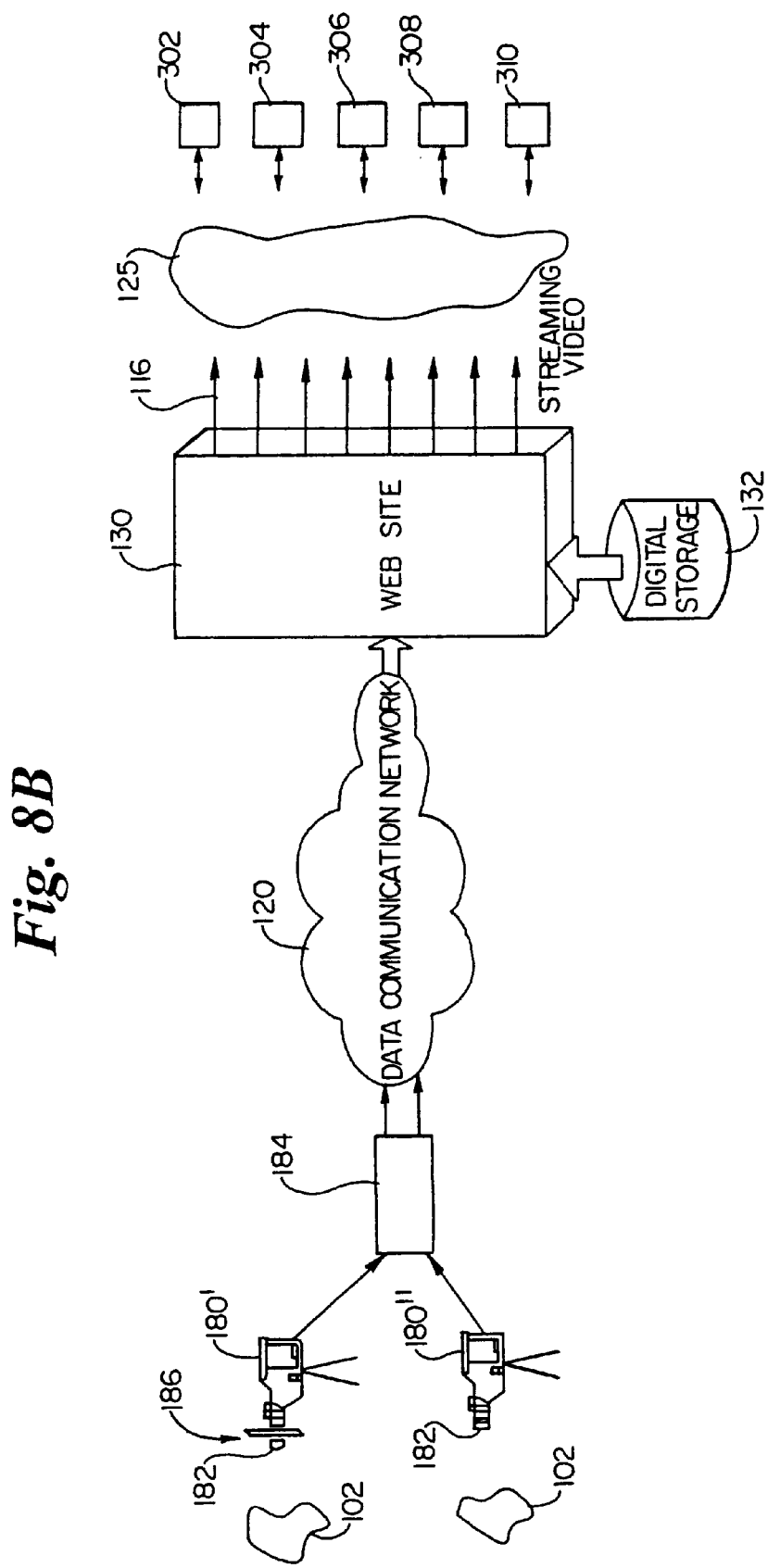

FIGS. 8A and 8B show another embodiment, using only a single camera, where an unlimited number of users may view any portion of the remote site 102. This embodiment uses a spherical lens 182 in optical communication with the camera 180. The remote site 102 shown in FIG. 8 is a remote watering hole or oasis as in FIGS. 7A and 7B.

As shown in FIG. 8A, a camera 180 has a spherical (or other wide angle) lens 182, which provides a 180° spherical (or other wide-angle) view. This view, which is communicated to a computer 184, contains distortion. The computer 184 communicates and compresses the distorted video back to the web site 130 or 140 which stores and may process the image. Rather than using the computer 184, a simple transmitter may be used to convey the entire spherical video to the web site 130, 140 (FIGS. 2 and 3). By using appropriate image processing software, the web site removes the barrel distortion and stores data relating to the entire spherical view. Users may then access different portions of the 180° sphere. In this embodiment, the toolbar 151 of FIG. 5 is also used. By using the toolbar 151, users may move across the spherical view and obtain the "perception" of camera control. This embodiment is advantageous in that it can provide the perception of camera control to any number of users simultaneously using only one remote camera. FIG. 8B shows alternative embodiments of the system shown in FIG. 8A. As shown in FIG. 8B, the spherical (or other wide angle) lens 182 is used with video camera 180", which conveys video information to computer 184. Computer 184 communicates the video over communications network 120 to the web site 130. The web site 130 may store or process the received video, and make the video available to users at user terminals 302, 304, 306, 308, 310 by communicating the video over communication network 125. Communication network 125 is explained in more depth below with respect to FIG. 10.

Because wide angle lenses generate distortion, processing is conducted on the distorted image to remove the distortion from a segment of the image. This processing may be performed at the computer 184, or the web site 130, but is preferably performed at the user terminals 302, 304, 306, 308, 310.

Thus, the web site 130 has available wide angle video for sending to users. Users display and view only a segment of the wide angle video at a time. Then, by using toolbar 151 (FIG. 5), the user may select adjacent segments of the video for view. When a user selects an adjacent segment of the video for display, the adjacent segment is processed to remove distortion and then displayed. Displaying the adjacent segment gives the appearance that the camera was physically "moved" to the adjacent side of the original segment.

One system for electronically removing the distortion from a segment of an image obtained from a fish-eye lens is disclosed in U.S. Pat. No. 5,185,667, issued Feb. 9, 1993 to Zimmerman, incorporated herein by reference. Zimmerman's apparatus uses the following hardware for processing a captured and digitized image: a microcomputer connected to a remote control, computer control, X-Map and Y-Map; an input image buffer connected to the X-Map and Y-Map with an output connected to an image filter and an output image buffer. This hardware, for example, or any other suitable hardware, may be placed at the computer 184, or the web site 130, but is preferably located at the user terminals 302, 304, 306, 308, 310.

As a preferred alternative, the specialized hardware is removed and the hardware functionality is implemented in software at the computer 184 or web site 130, but preferably the software is loaded into the user terminal 302, 304, 306, 308, 310. Thus, in accordance with the present invention a spherical (or other wide angle) image is supplied to the user's terminal, which executes appropriate software (which may be a "plug-in" for a browser application program) for displaying a segment of the image (or video) without distortion. Additionally, the distorted spherical image (or video) may be saved to a storage medium, either at the user's terminal or at the web site, for future loading and viewing.

FIG. 8B also shows how to remove the lens distortion without special processing. As shown in FIG. 8B, a spherical (or other wide angle) lens 182 is in optical communication with a video camera 180'. However, a nonlinear imaging sensor 186 is placed between the spherical lens 182 and the video camera 180'. The imaging sensor is designed to provide a distorted output which cancels out the distortion of the spherical lens 182, and thus an undistorted wide-angle image is provided to video camera 180'. Alternatively, imaging sensor 186 may itself provide a digital output, making it unnecessary to use a camera 180'. In this case, the imaging sensor 186 would be directly connected to computer 184.

Examples of imaging sensors 186 are disclosed in U.S. Pat. No. 5,489,940, issued on Feb. 6, 1996 to Richardson et al., and in PCT publication WO 96/12862, published Jun. 13, 1996 to Richardson et al., each incorporated herein by reference. Other suitable imaging sensors may be used with the present invention.

The image obtained by the imaging sensor 186 may be undistorted and not require further processing. A segment of the image may then be selected for display by simply passing the image data to a display device. If the imaging sensor is imperfect, further processing may occur to correct for defects in the sensor. Additionally, further processing for "zoom" and "unzoom" functions may occur. This further processing may take place at the web site 130 or at the user's terminal 302, 304, 306, 308, 310.

The embodiments of FIGS. 5 through 8 may be used in conjunction with either live audio and video or prerecorded video data (with audio) (shown in FIGS. 1–3). For example, if nothing interesting is happening at the watering hole, a connected user may access a stored audio and video clip of a lion attack which occurred the day before. If "perceived" camera control is utilized, the stored audio and video preferably includes all camera angles (or a wide-angle view), such that the ability to pan and zoom is preserved.

5. Web Site Configuration.

Figure 9A:
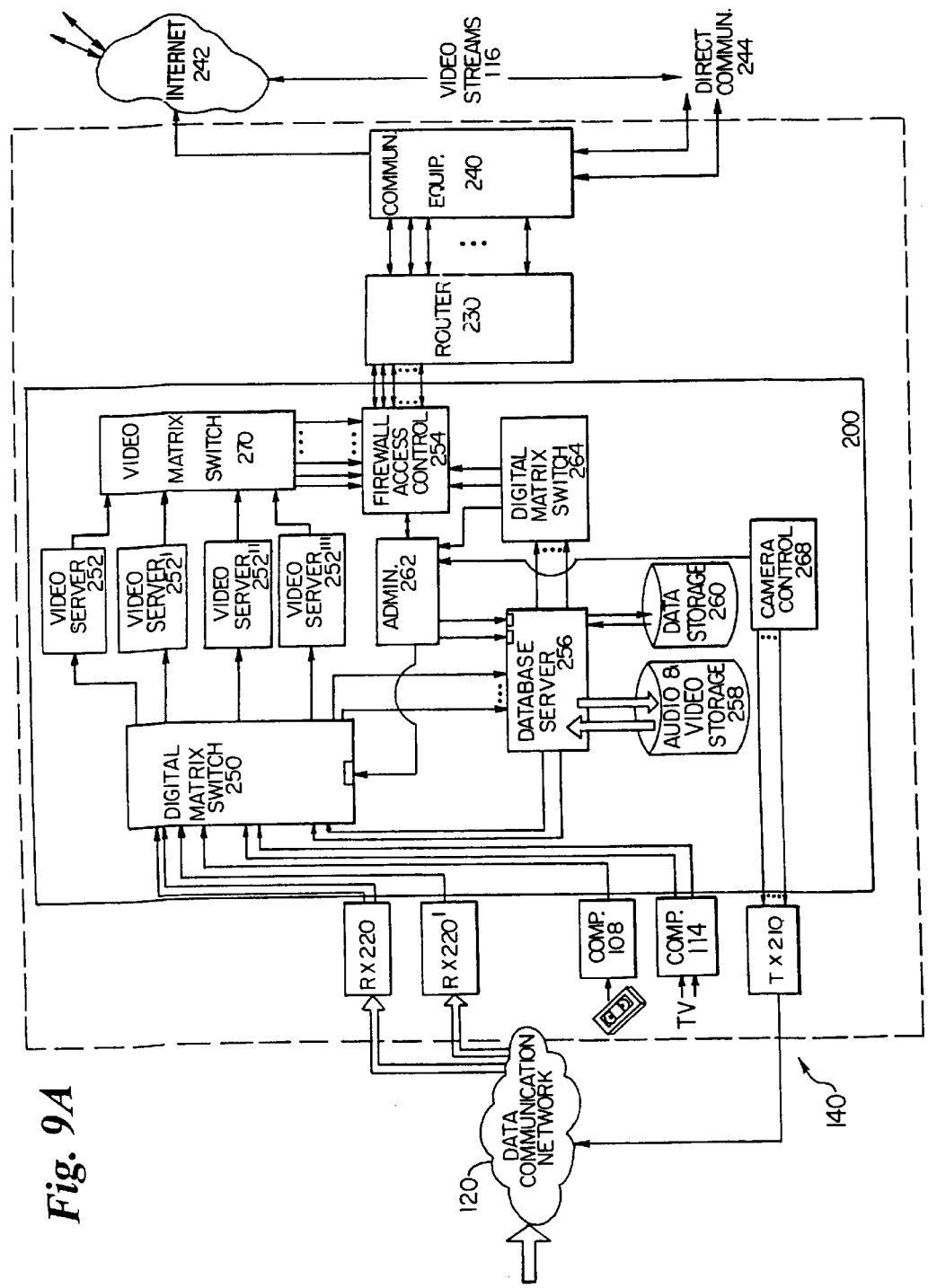
FIGS. 9A and 9B are block diagrams of a server platform.
Figure 9B:
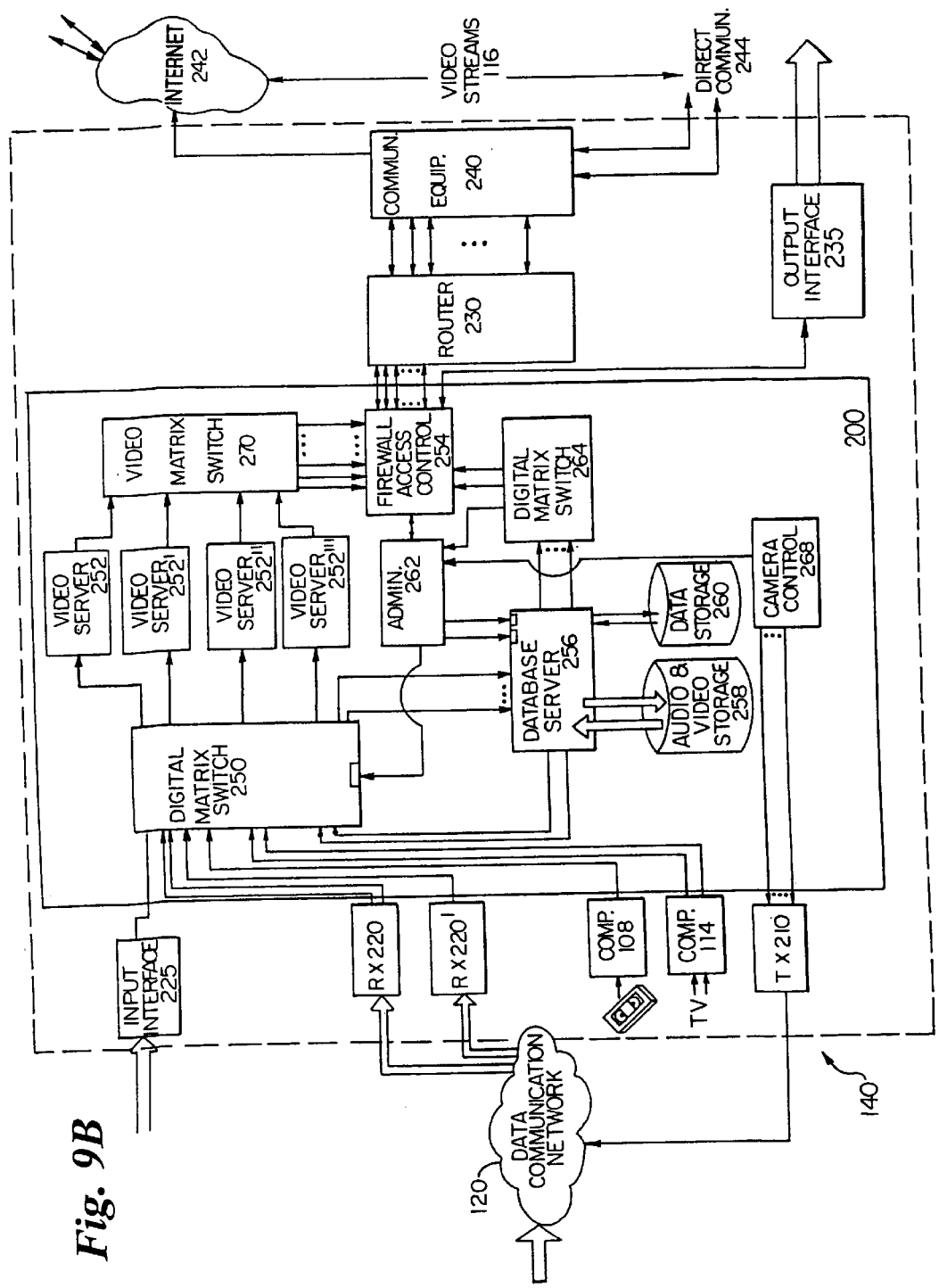

FIGS. 9A and 9B show a more detailed view of the web site, listed as web site 140 (FIG. 3), but which may also correspond to web sites 112 (FIG. 1) and 130 (FIG. 2). The web site 140 is connected to a data communication network 120, the internet 242, and direct connections 244. The web site contains transmission equipment 210, receive equipment 220, 220,' two compression units 108, 114, a web server 200, a router 230, and communication equipment 240. The web server 200 itself contains a digital matrix switch 250, a plurality of digital video servers 252, 252', 252", 252,''' a firewall access control unit 254, a database server 256, an audio and video storage unit 258, a data storage unit 260, an administrative unit 262, a digital matrix switch 264, a camera control unit 268 and a digital video matrix switch 270.

The web site 140 is connected to the data communication network 120 by transmission equipment 210 and receive equipment 220. As shown, multiple receivers 220, 220' may be used. Also, as shown, the receivers may have more than one video output. Audio and video signals may also be input to the web server 200 by videocassette (or other suitable recorded media) or simply by feeding in television programming. As with FIGS. 1 and 3, these signals are preferably compressed by compression units 108, 114. On the opposite side, the web server 200 is connected to remote users by a router 230 and communication equipment 240, which in turn are connected to the internet 242 or directly connected 244 to users. The communications equipment 240 outputs the video streams 116 through a number of input/output ports.

As previously stated, the web server 200 contains a digital matrix switch 250, a plurality of digital video servers 252, 252', 252", 252,''' a firewall access control unit 254, a database server 256, an audio and video storage unit 258, a data storage unit 260, an administrative unit 262, a digital matrix switch 264, a camera control unit 268 and a video matrix switch 270.

The digital matrix switch 250 receives all incoming compressed video signals from the receivers 220, 220' and the compressor units 108, 114. The matrix switch 250 also receives compressed video data from database server 256. Under control of the administrative unit 262, the digital matrix switch 250 outputs the input compressed video signals to digital video servers 252, 252', 252", 252'''. In this manner, any input signal can be transferred to any video server as directed by the admin unit. Also, stored programming from the database server 256 is routed to the digital matrix switch 250 to be switched as if it were incoming live video. The outputs of the digital matrix switch 250 also connect to the database server 256, so that anything at the inputs, such as incoming live audio and video, can be stored in the database server 256.

The compressed input video is passed into various digital video servers 252, 252', 252", 252'" for formatting. Users who connect to web server 200 preferably run their own decompression software so that the no decompression need occur at the web server 200. As an alternative, the digital video servers may decompress the input video.

The audio and video from the video servers 252 are passed through a second digital (video) matrix switch 270. Since switching has already occurred at the digital matrix switch 250, the second video matrix switch 270 is not required, but is desired for maximum flexibility. It is also optimal where the number of users exceeds the number of video inputs, as one input may be channeled to numerous connected users.

In a preferred embodiment, the matrix switch 270 may contain a processor which joins different frames of video and audio such that each output contains frames for multiple video pictures (including audio). This enables users to receive split screen images of video and select an audio track for playback (see FIG. 14, discussed below). The split-screen images may be formed by using known methods, which may differ depending on the type of compression used. For example, digital images may be decompressed, combined with other decompressed images, and then re-compressed; or the images may be decompressed and converted to analog, combined, and then converted to digital and compressed for transmission.

The signals switched by the video matrix switch 270 are preferably digital. This is because the communicated video streams 116 are preferably digital. It is preferred to process all the signals in the web server in the digital domain to improve simplicity and maintain maximum flexibility.

The various streams of video output from the video matrix switch 270 are passed to the firewall access control unit 254 for output to the router 230 and the communication equipment 240.

Using this system, any user may receive any signal present at any input, including stored signals within audio and video database 258 or data storage unit 260. Additionally, any compressed digital signal present at the input to digital matrix switch 250 may be stored in the audio and video storage unit 258 or data storage unit 260. This is advantageous in the perceived camera control embodiment (FIGS. 4–8) where the web server 200 must output a different video picture to the user upon user request. When the user request is received by the web server 200, the administrative unit 262 directs the matrix switches 250 and 270 to output the correct video stream to the user. If the user is requesting stored video, the administrative unit directs the database server 256 to provide the video to digital matrix switch 250. If graphics or textual data are required, the administrative unit 262 directs the database server 256 to output the text or graphics to digital matrix switch 264.

Although shown as one functional box, the database server 256 may be implemented by using several servers and/or multiport servers. The audio and video storage unit 258 and data storage unit 260 may be implemented by using many storage media of different types, such as optical storage devices (i.e. CD-ROM), magnetic disks, magnetic tape, or memory circuits (i.e. RAM/ROM). The number of units depends on the amount of stored data, the number of users, and the desired output speed. The database server 256 may be one or multiple units. The audio and video storage unit 258 stores (preferably compressed) audio and video presentations, including all relevant camera angles. The video servers 252 may also be implemented as one or more servers and/or multiport servers.

The data storage unit 260 is used to store information relating to audiovisual displays. This information relates to the menu structure and screen displays communicated to connected users. The stored information may also relate to specifically to the audio and video which is currently being displayed and heard. For example, in the demolition embodiment of FIG. 5, a user may click on a "more info" icon, to obtain information on demolition. Such information, which could include statistics on dynamite, for example, would be stored as text or graphics in data storage unit 260. The "more info" command would be transmitted to the communications equipment 240, pass through the router 230, and the firewall access control 254 to administrative unit 262. The administrative unit 262 then directs the database server 256 to recall the relevant information, such as statistics on dynamite, from data storage device 260 and pass the information to digital matrix switch 264. The recalled information is then passed to the firewall access control unit 254, the router 230, and the communication equipment 240 for transmission to the proper subscriber. The data may be combined with audio and video in the firewall access control unit 254, or be a separate transmission.

In the perceived camera control embodiment, the communication equipment 240 forwards the user's command (such as "pan right") to the router 230, which detects the command and forwards it to the firewall access control unit 254, which passes it to the administrative unit 262. The administrative unit 262 controls the video being fed to each connected user. The administrative unit 262 also responds to user commands by instructing either the matrix switch 250 or the matrix switch 270 to pass a different audiovisual signal from another source (i.e. camera, for example, the camera to the right of the present camera) to the connected user. If the user is receiving a stored image from database 258, the administrative unit instructs the database server 256 to recall the appropriate video signal.

In the actual camera control embodiment (shown in FIGS. 3 and 7), commands from the user (such as "pan right") are received by the communication equipment 240 and forwarded to the router 230. The commands enter the web server 200 via the firewall access control unit 254, and are passed to the administrative unit 262. The commands may be stored in the administrative unit 262 or passed to the database server 256. Either way, the commands pass through the camera control unit 268 which formats the commands as necessary for remote camera control. The formatted commands are passed to the transmission unit 210. The transmission unit 210 provides the commands to data communication network 120 for reception at remote cameras and CPU 134 (FIG. 3).

In the spherical (or other wide angle) lens embodiment (shown in FIGS. 8A and 8B), where the remote camera uses a spherical lens 182, the administrative unit 262 determines which segment or quadrant of the audiovisual image is to be supplied to the user in response to the user's command. In this embodiment, the spherical image is stored in database 258 prior to being output to digital matrix switch 250. The image is split into a number of sections, which when combined form the entire 180° sphere. By using suitable image processing software, the distortion is removed or minimized in each segment. The administrative unit 262, in response to a user command, determines which segment of the sphere should be sent to the user. The administrative unit then directs the database server 256 to retrieve and output the correct segment to the digital matrix switch 250. By controlling the digital matrix switch 250 and video matrix switch 270, the administrative unit 262 is able to ensure that the user receives the correct segment of the spherical image.

However, as previously stated, in one preferred embodiment the entire spherical (or other wide angle) video is communicated to the user, and the distortion removed by software at the user's terminal. This minimizes the complexity of the processing necessary at the web site 140, and allows the user to store the entire spherical (or other wide angle) video.

Figure 15:
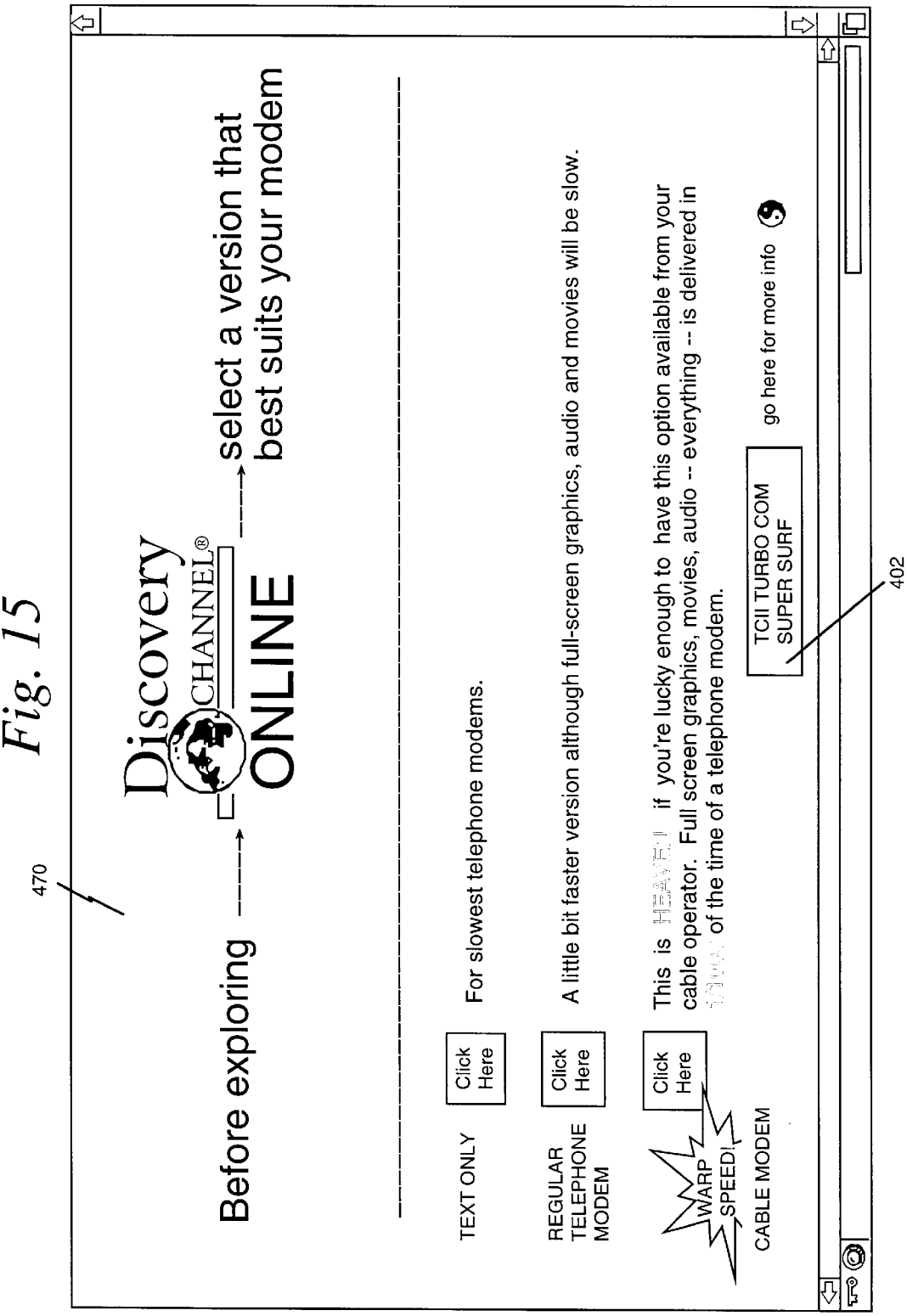
FIG. 15 shows a page directed to determining the user's data rate.

Preferably, the communication equipment 240 is designed to automatically determine the maximum data rate at which information can be transmitted to the connected users. The data rate depends on the type of connection the web sites has with the user, and the type of equipment the user is operating. In one embodiment, the communications equipment uses the maximum data rate possible as sensed from the user's communications. Alternatively, users may enter their data rates when prompted by a menu screen, as shown in FIG. 15 and described below. The data rates are then stored in communications equipment 240. The communications equipment 240 may also compress the video streams prior to transmission using any known compression algorithm. Additionally, the communications equipment may remove video frames, preferably prior to compression, such that the resulting data rate is reduced to be compatible with the user.

FIG. 9B is identical to FIG. 9A, but contains an input interface 225 and an output interface 235. The input interface 225 is used to obtain digital video from other sources, such as a paging system, cellular system, cable television system, etc.

The output interface connects the web site to other communications systems such as paging systems, cellular systems, or cable television systems. In the case where the input interface connects to an analog system, it contains suitable analog to digital converters (not shown). Also, where the output interface connects to an analog system, it contains suitable digital to analog converters (not shown).

For example, the input interface 225 may obtain images or video from a paging system, and the output interface 225 may be connected to a paging system to broadcast video or images to a selective call receiver. In this regard, the following publications are incorporated by reference, each of which relates video/images to selective call receivers: PCT Publication No. WO 96/07269, published Mar. 7, 1996 by Jambhekar et al., PCT Publication No. WO 96/21173, published Jul. 11, 1996 by Harris et al., and PCT Publication No. WO 96/21205, published Jul. 11, 1996 by Harris et al.

6. Communication to the User Terminals.

FIG. 10 shows how the users are connected to the web site, and shows an example of a communications network 125 (FIG. 8B) in detail. The connections shown in FIG. 10 apply to the web sites of the previous figures, including the web site 112 (FIG. 1), 130 (FIG. 2) and 140 (FIGS. 3 and 9). FIG. 10 shows a server platform 200, the internet 242, two direct connection 244, two traditional internet hosts 272, 274, two cable internet hosts 276, 278, a satellite-based internet host 280, a telephone dialup 282, an ISDN channel 284, a cable plant 286, 288, a satellite system 290 and a plurality of connected user terminals 302, 304, 306, 308, 310.

In operation, the web site 112, 130, 140 may communicate over the internet 242 to a number of different systems. These systems include a traditional internet host 272, 274 and a cable headend internet host 276. The traditional internet host 272, 274 may be connected via a telephone line 282 or an ISDN channel 284 to a plurality of remote user terminals 302, 304, respectively. The cable internet host 276 may be connected via a cable plant 286 to a remote user 306.

Alternatively, the web site is connected via a direct connection 244 to a cable headend internet host 278 or satellite-based internet host 280. The cable headend internet host 278 communicates to a cable plant 288 and a remote user terminal 308. The satellite-based internet host 280 communicates via a satellite 290 to a user terminal 310. These direct connections 244 enable a higher data rate and use a high speed cable modem.

It is advantageous that the communications equipment 240 (FIG. 9) enables communications with any type of user terminal no matter what the data rate or system. Of course, user terminals with higher data rates will receive higher quality audio and video images.

7. Exemplary Screen Displays and Features.

FIGS. 11–16 show examples of display pages which are shown at the remote user's terminal. The pages and menus are stores in data storage unit 260 (FIG. 9) as graphical and/or textual information.

Figure 11:
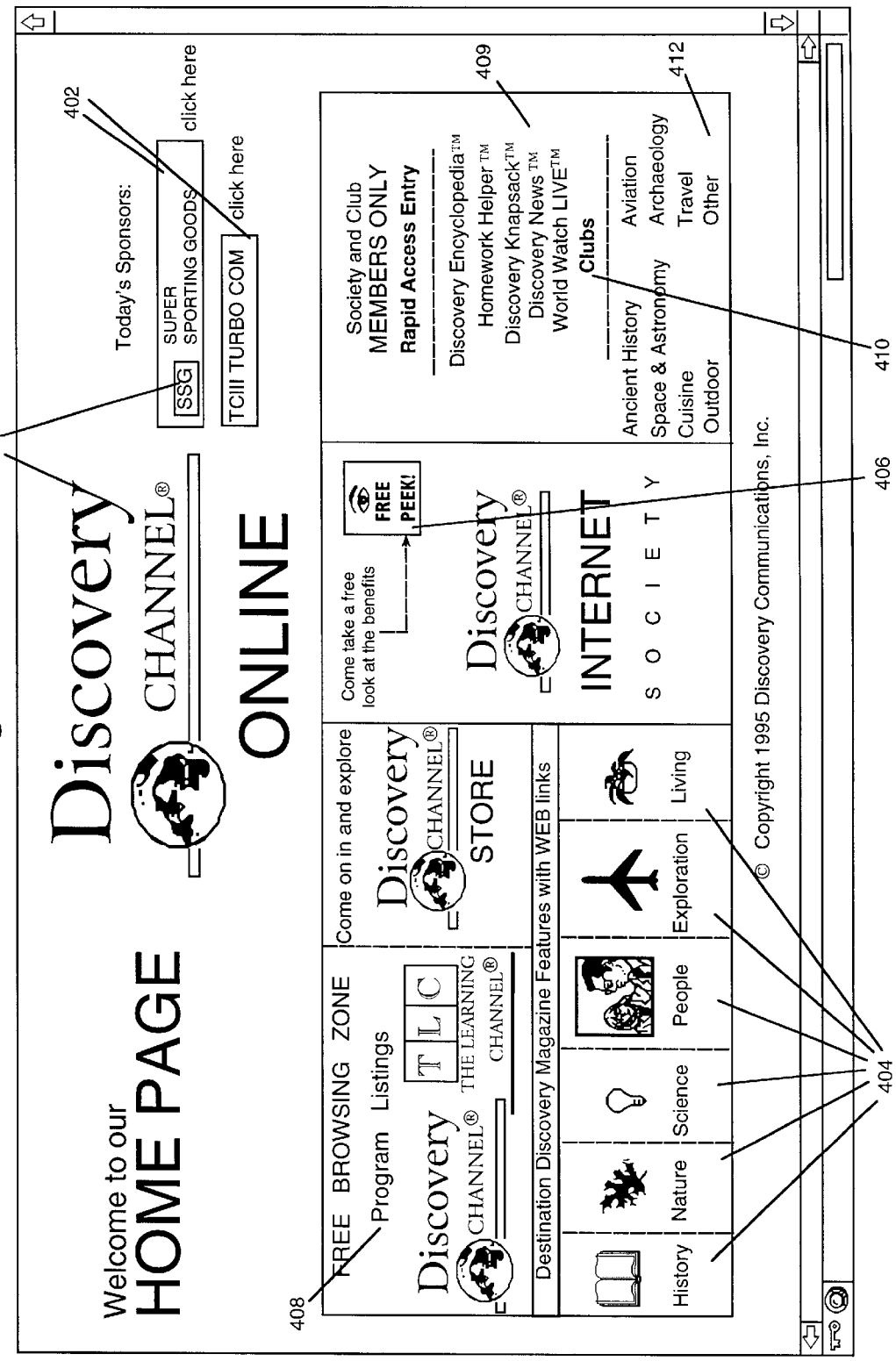
FIG. 11 shows a home page in accordance with an embodiment of the invention.

FIG. 11 shows an example of a home page, using advantages of the present invention. The home page 400 contains a number of advertisements 402, numerous web links 404, a society link 406, options for viewing television programming 408, a plurality of rapid access entry options 409 including a "World Watch Live" option 410, and options for clubs 412.

The advertisements 402 are useful for the page provider to generate revenue. As described previously, the system is designed such that television programming can be supplied over the internet. Users may view television programming by selecting the home page television option 408. The Magazines 404 are used to provide information concerning specific topics to the user. Users may join a society, having additional membership benefits, through the "society" selection 406. The "World Watch Live" feature 410, part of the rapid access entry options 409, is selected when users wish to watch live video from remote sites. The clubs shown in the club option 412 are selected by users who wish to obtain information related to common areas of interest.

Figure 12:
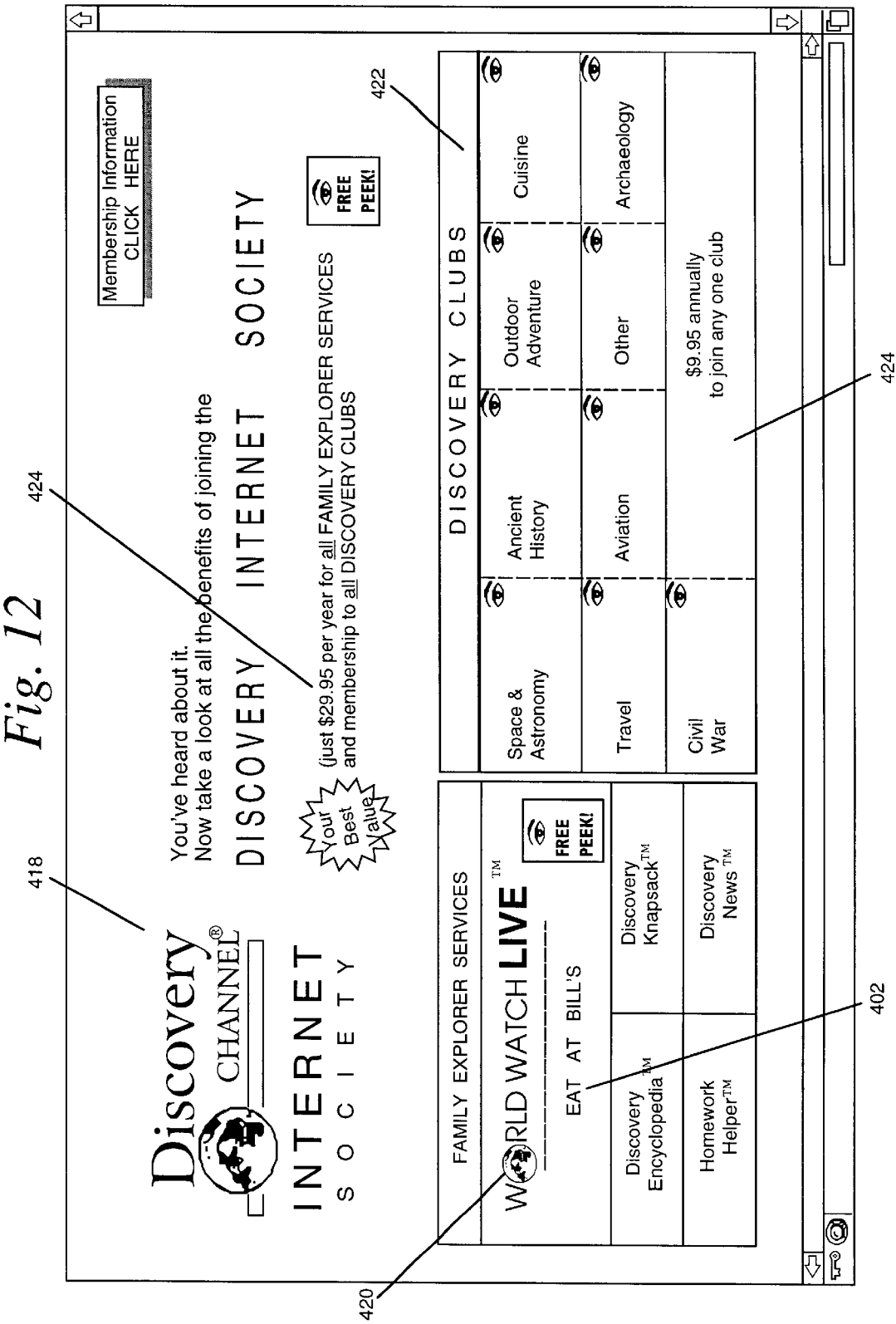
FIG. 12 shows a "society" page in accordance with another embodiment of the invention.

FIG. 12 shows a society menu 406, selected from the FIG. 11 home menu page. As shown in FIG. 12 there are options for "World Watch Live" 420, there is an advertisement 402, subscription information 424, and numerous club options 422. This screen and all the functions selected in response to the displayed options may be provided on a subscription or temporarily free basis.

Figure 13:
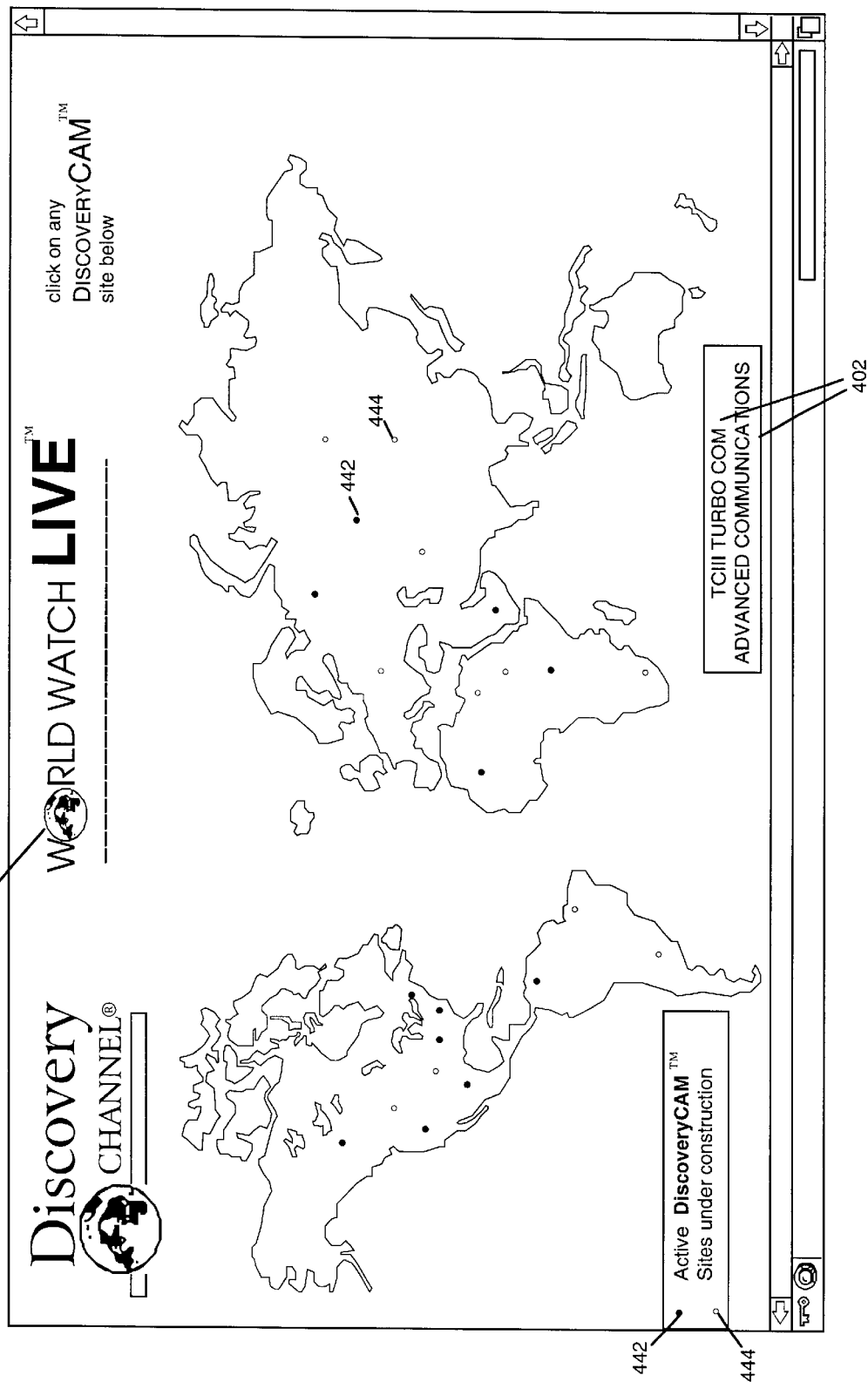
FIG. 13 shows a "map" page of remote camera locations throughout the world.

FIG. 13 shows one example of a "World Watch Live" menu 440. This menu is used to select remote locations from which to observe live or prerecorded video. In this example, a map of the world is presented with sites that are available to select for observing live video. The screen indicates sites that are active 442 or under construction 444. This menu also contains two advertisements 402.

The "World Watch Live" embodiment allows connected users to visit virtually anyplace in the world to learn more about its culture, geography, or environment. Coupled with perceived or actual camera control and associated prestored video, textual and graphical information, a powerful and inexpensive learning tool is realized. This is more closely shown in FIG. 14.

Figure 14:
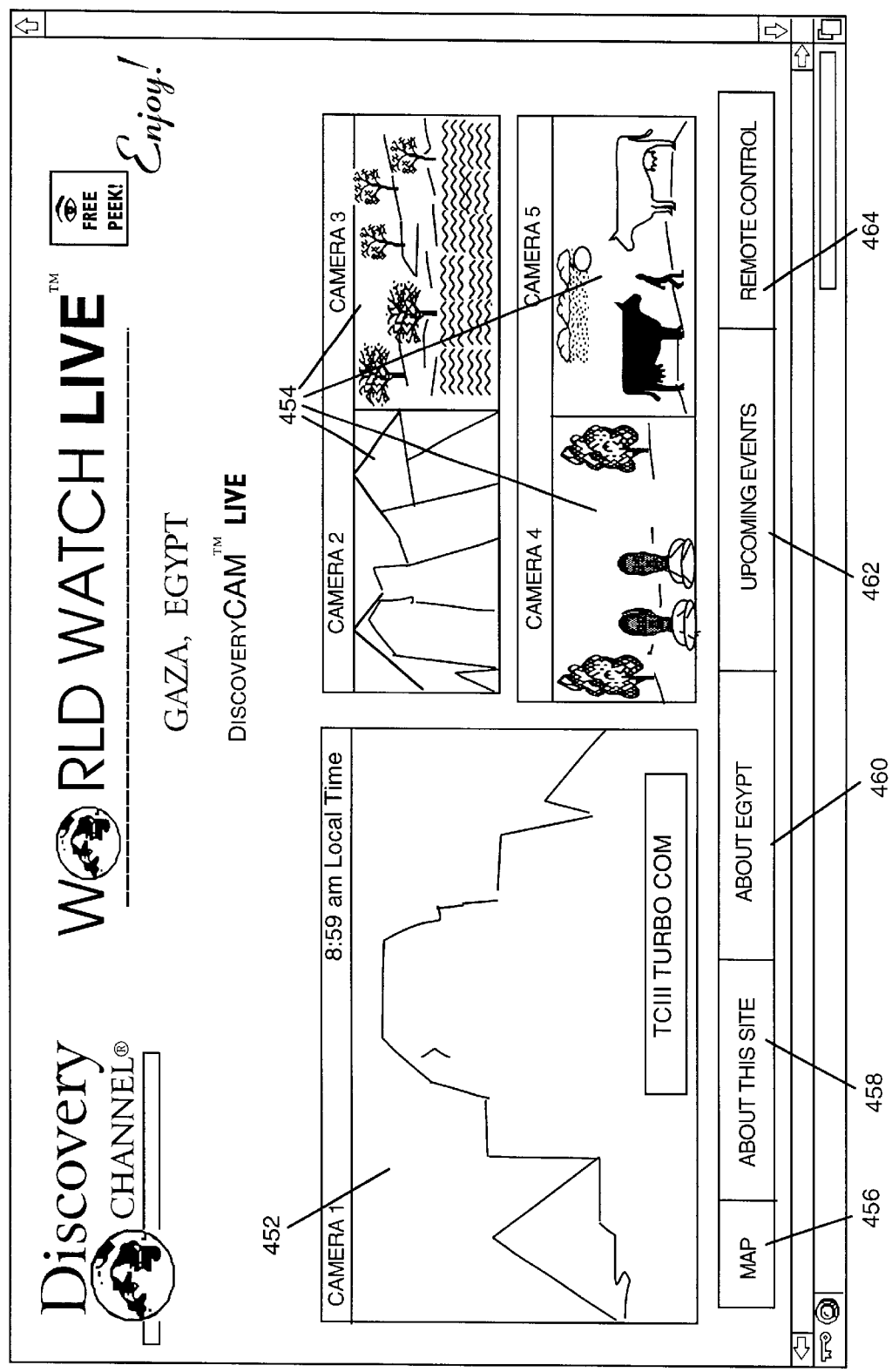
FIG. 14 shows a "watch" page containing live video feeds from five remote cameras.

FIG. 14 shows a menu 450 which corresponds to the Egyptian site in FIG. 13. This screen concerns "Giza, Egypt", and contains live video from five cameras. As shown in the screen, there is camera one 452, cameras two through five 454, a "Map" option 456, an "About This Site" option 458, an "About Egypt" option 460, an "Upcoming Events" option 462 and a "Remote Control" option 464. Camera one 452 is the default for the main viewing camera. The user may select video image sizes and the number of images to be displayed, limited by the equipment the user is operating. Video from cameras two through five are supplied along with that from camera one to provide alternative sites and viewpoints about the topic of the screen (i.e. Egypt).

The "Map" option 456 brings the user back to the world map (FIG. 13) to select additional sites. The "About This Site" option 458 brings up text, graphics or additional video concerning the site of Giza, Egypt. For example, a professor appears and talks about the origin of the Sphinx (shown by camera 1). The embodiment shown in FIG. 16 and described below (interactive lecture) may be combined with the "About This Site" option. Additionally, other video may be displayed in response to selection of "About This Site". Such video may be a documentary of the Sphinx or discussion about the technology that historians estimate was used to construct the Sphinx.

The "About Egypt" option 460 brings up graphics, text or additional video concerning Egypt. For example, a map of Egypt with population densities may be shown. The option for "Upcoming Events" 462 brings graphics, text or video concerning new events in Egypt. For example, text and newspaper articles concerning the construction of new irrigation canals is displayed. "Remote Control" option 464 brings up a command menu (such as the "tool bar" 151 of FIGS. 5A–D) which allows the user to change camera angles or positioning in any of the cameras capable of that effect. The menu would apply to actual or perceived camera control. For example, the user could pan around the Sphinx (camera 1, shown at 452) to observe it from the front, each side, and back.

Thus, this single screen relating to Egypt provides a wealth of information at a single internet address (or web site). It is unnecessary for a user to "link" to other locations on the internet. Audiovisual presentations are displayed, which give the user insight into the people and culture of Egypt. Text, graphics, and additional stored video is available to further educate the user. Camera control (actual or perceived) gives the user the feeling of walking around different locations in Egypt.

FIG. 15 shows a screen 470 which asks users about their equipment in order to determine the appropriate data rate for communications. Preferably the screen is not needed and the data rate is determined by communication equipment 240 automatically. Note that an advertisement 402 is also shown on this screen.

Figure 16:
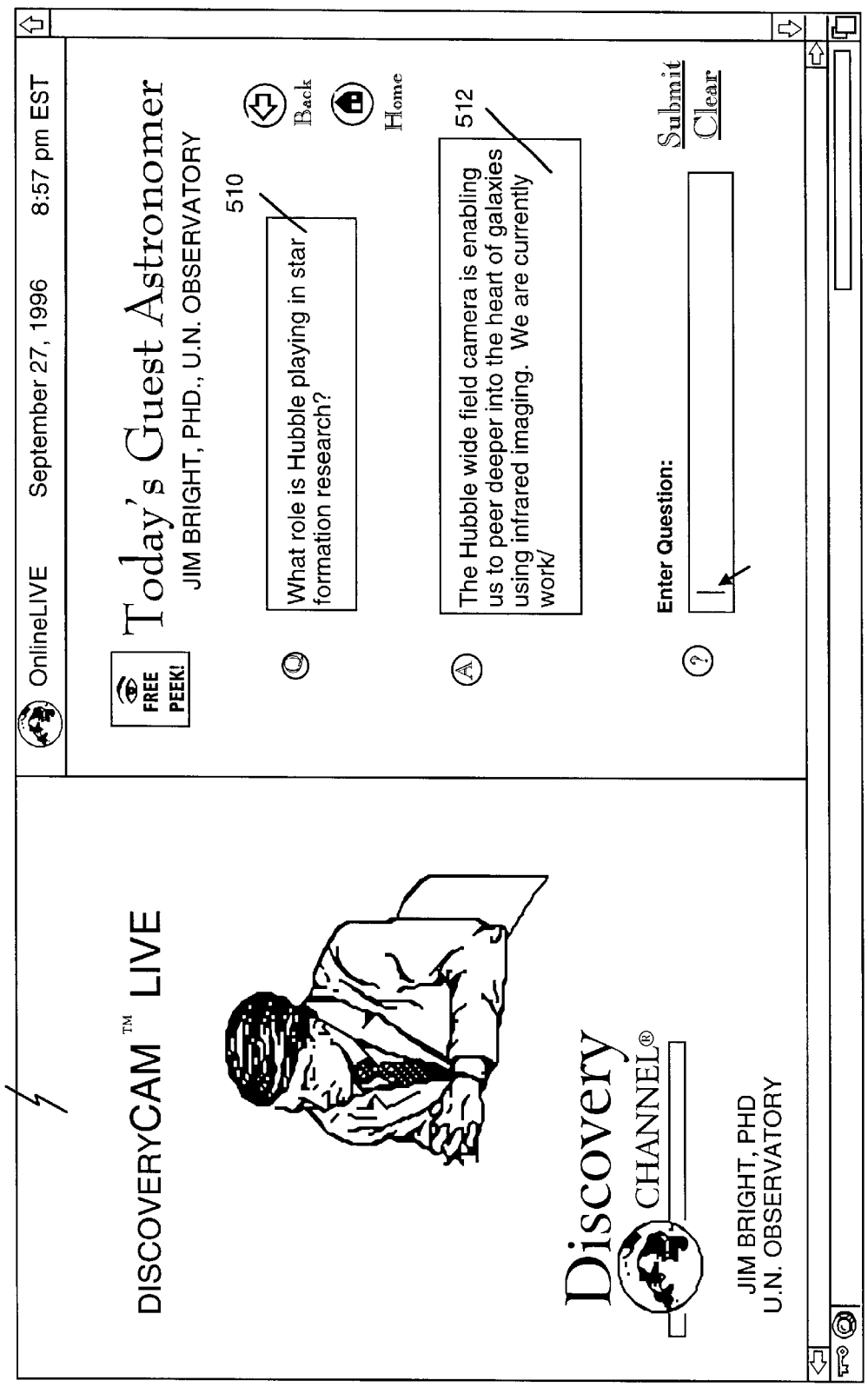
FIG. 16 shows a page of an interactive lecture.

FIG. 16 shows an interactive lecture embodiment of the present invention. As shown in FIG. 16, live video 500 of an astronomy professor's lecture is transmitted to connected users. The users are able to ask the professor questions 510 and receive answers 512. The live video 500, questions 510, and answers 512 are shown to all connected users. Preferably, the users enter questions via keyboard or microphone. However, if suitable data rates are available, the user may ask a question via video. Thus a split screen video showing both the person asking the question and the lecturer may be presented to all users simultaneously. The answers are preferably given by the lecturer, who may observe the question on a remote display. Alternatively, the answers may be supplied by the web site as text, graphics, or prestored video. The answer may pass through a closed captioning device, be encoded, and displayed on the screen in an answer box 512.

Referring to FIG. 9A, questions are sent to the web site 140 as part of the normal user terminal communication. The web site 140 receives the question at the communications equipment 240 and forwards the question through router 230 and the firewall/access control unit 254 to the administrative unit 262. The administrative unit 262 determines whether the question can be answered by playing stored video or showing stored text or graphics. If so, the administrative unit 262 directs the database server 256 to recall the appropriate information. The information is then output through the matrix switches 250, 270 or 264, under control of the administrative unit, as appropriate. The ability of the administrative unit to answer questions depends upon the complexity of its software. Simple, prestored answers to frequently asked or standard questions may be provided in a basic system. More advanced systems may utilize an interpreter to analyze the question before providing an answer. For example, frequently asked questions in the astronomy field may be "what is a star?" or "how was the galaxy formed?" In response to these questions, which may even be provided on a menu or list, the administrative unit recalls prestored answers in either video, text, or graphics.

If a question cannot be answered by the administrative unit, or is sent directly to the remote lecturer, the question proceeds to the remote lecturer in a similar fashion as the camera control signal (FIG. 3) discussed previously. However, in the interactive lecture embodiment, the camera control unit 268 (FIG. 9) is replaced with a question format unit (not shown) which reformats the question under control of the administrative unit 262. Transmitter 210 then transmits a question signal to the location of the remote lecture via the data communication network 120 and the communication paths 126, 128. The lecturer has a display which shows questions received over the data communication network.

In an alternative embodiment, the lecturer or a number of assistants may select from among many prestored answers in response to a question. In this embodiment, the remote lecturer has a computer and monitor (not shown) which displays the questions and the available prestored answers. The lecturer or assistants then match answers with the questions. The prestored answers are preferably forwarded to the individual who asked the associated question. In order for others to learn from the questions, the questions and answers may be provided to all connected users.

Figure 17:
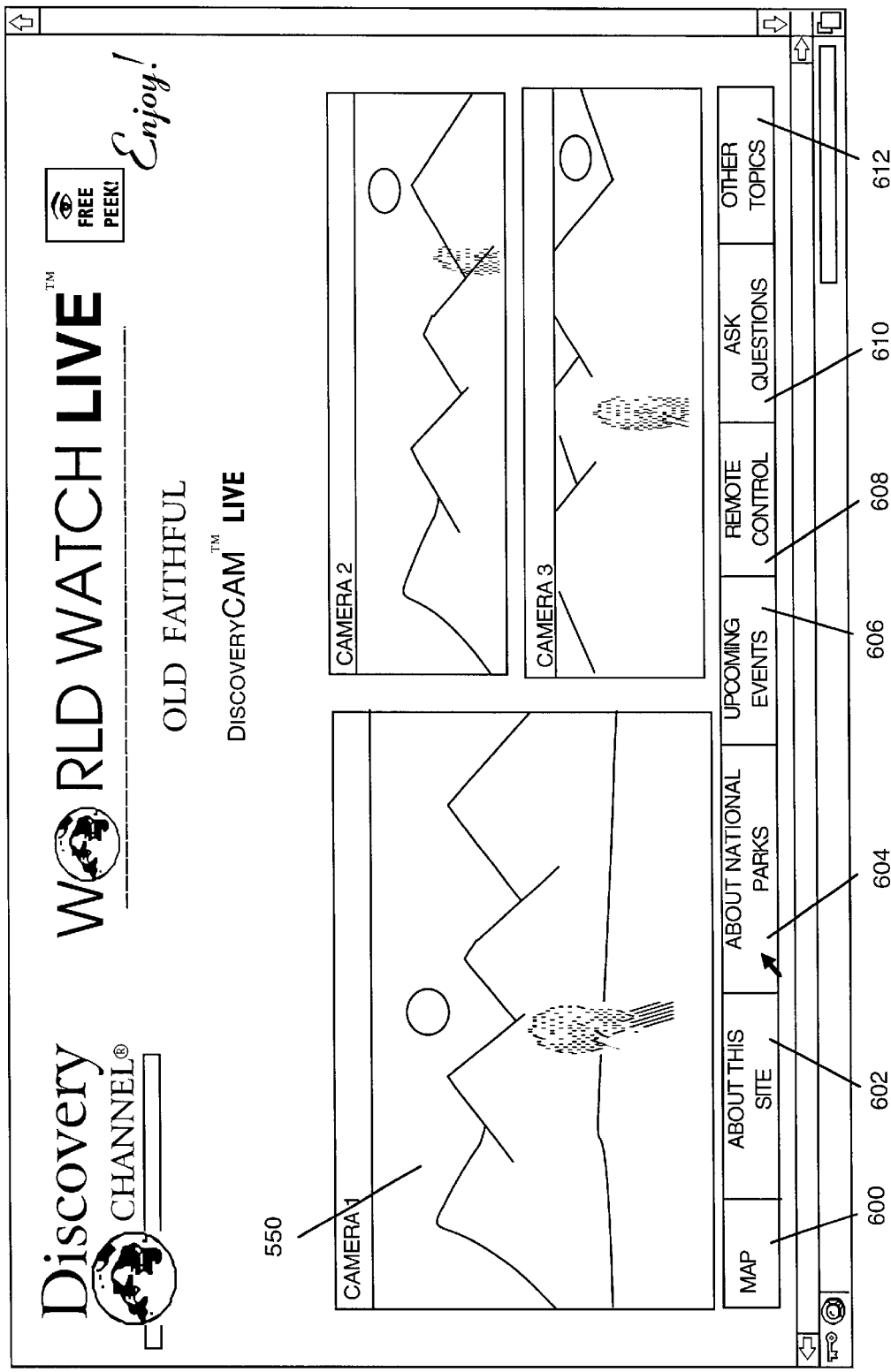
FIGS. 17 and 18 show pages of an embodiment of the invention which combines live video, prestored video, graphics, and interactive questions.
Figure 18:
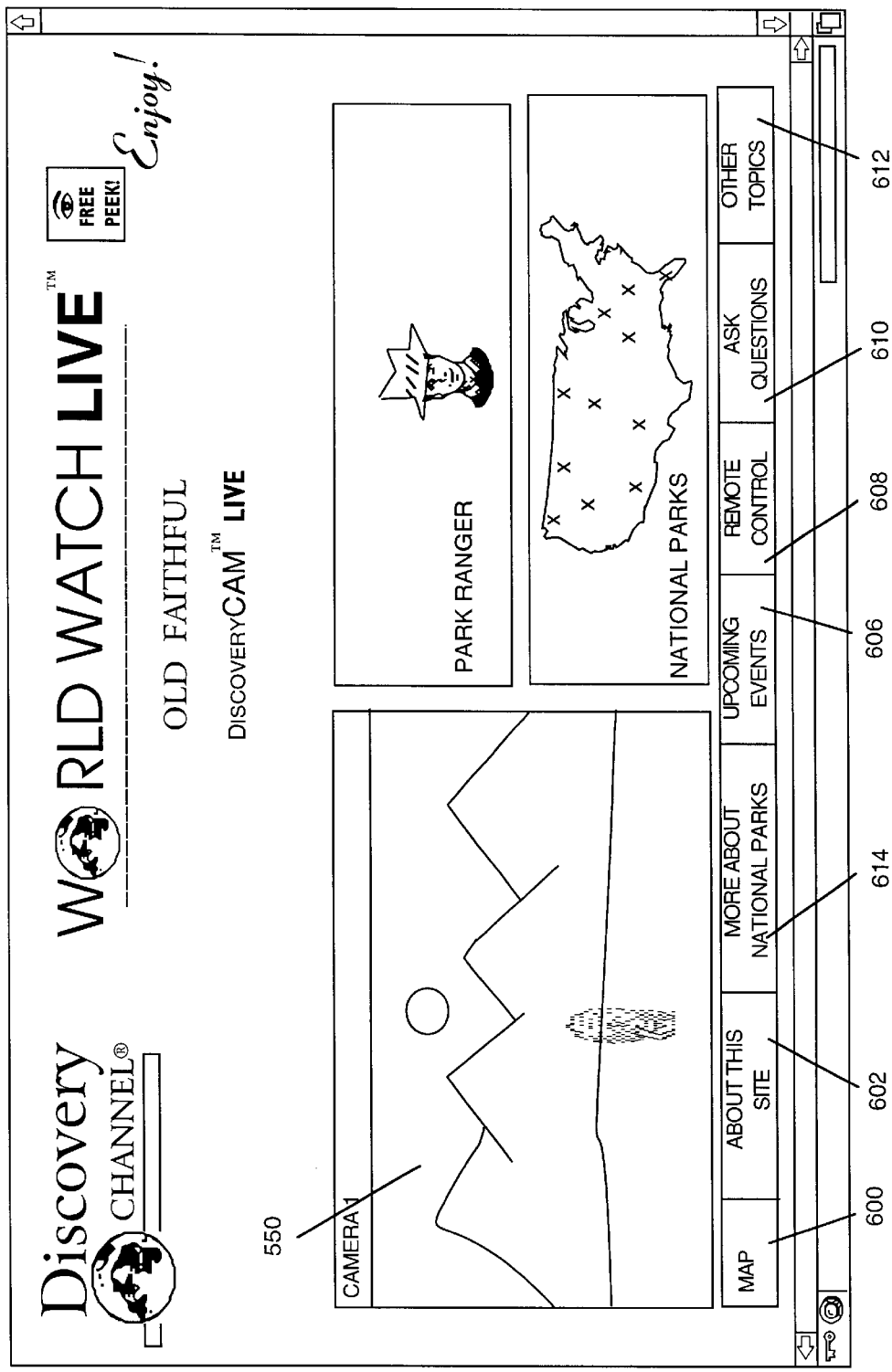

FIGS. 17–18 shows an embodiment of the invention using a combination of live video, stored video, stored graphics, camera control and interactive questioning. The live video 550 of camera 1 shown in FIG. 17 relates to a geological site, i.e. the geyser, "Old Faithful". Since the site is located on a National Park, the display screen has been customized to allow for the selection "About National Parks" 604. When this is selected, the user's command is communicated to the web server 112, 130, 140 for analysis by the administrative unit 262. The Administrative unit 262 determines that prestored video and graphics are required, and instructs the database server 256 to output the correct information: video to the matrix switch 250, and graphics to the matrix switch 264. The matrix switches, 250, 270, and 264, under control of the administrative unit 262, forward the video and graphics to the user through the communication equipment 240.

FIG. 18 shows the result at the user terminal. The communicated prestored video 560 of a Park Ranger appears on the screen. The Park Ranger discusses the topic of National Parks. The discussion occurs in conjunction with a graphical display of the locations of all National Parks, shown at the screen location 570.

The user may select other options, such as "Map 600" to return to the map of all remote sites, "About This Site" 602 to learn more about the site currently viewed, "More About National Parks" 614 for even more information about National Parks, "Upcoming Events" 606 for a schedule of upcoming events, "Remote Control" 608 for remote (either actual or perceived) control of the camera (i.e. camera 1), "Ask Questions" 610 for asking questions (as in FIG. 16) to an on-line Park Ranger, and "Other Topics" 612, for a list of other topics and/or options.

Therefore, the present invention provides an easy and fun way to learn, by combining live video, prestored video, graphics and text with interactive questioning and actual or perceived camera control.

8. Surveillance Systems.

The present invention may be used in a surveillance or tracking system. For example, a researcher may place a video camera in the center of a watering hole, preferably connected to a video recorder for storing many hours of activity at the watering hole. Preferably multiple cameras or a wide-angle lens are used such that virtual camera control (as described previously) may be performed on the video. Such a surveillance system has many advantages.

First, the system allows for automatic scanning of the surveyed area, without the need for moving any cameras. Additionally, multiple segments of the area under surveillance may be viewed at the same time in a split-screen image. All that needs to be done is the removal of distortion in multiple segments of the video (if using a wide-angle lens). The disclosure of U.S. Pat. No. 5,359,363, issued Oct. 25, 1994 to Kuban et al., incorporated herein by reference, discloses one example usable with the present surveillance system.

Second, automatic monitoring and/or tracking may be performed. Often, researchers and photographers wait through long periods of inactivity before a desired event occurs. For example, a photographer may wait for hours for a lion or other wildlife to approach the photographer's position. The present invention may be used to automatically monitor a remote region for activity. In this case, a processor may monitor the multiple cameras or the digital wide-angle video for pixel changes indicating the desired event. For example, an approaching lion in an otherwise inactive desert environment will cause a moving pattern to form on a camera's output or in the wide angle image. A processor may detect the pattern and alert a wildlife researcher that an event is occurring.

Further, the processor may automatically and continually display the relevant camera output, or the segment of the wide angle image containing the lion, thereby tracking the lion. Thus, the present invention may employ tracking techniques, known in the prior art, to the obtained digital image.

In the monitoring and tracking embodiment of the present invention, it may be desirable to remove the distortion from the wide angle image prior to performing the processing to determine whether an event is occurring. The type of event being monitored and nature of the object being tracked controls whether monitoring and/or tracking may be performed on the distorted or undistorted image. One of ordinary skill in the art will choose the system best suited for the particular monitored event or tracked object.

Figure 19:
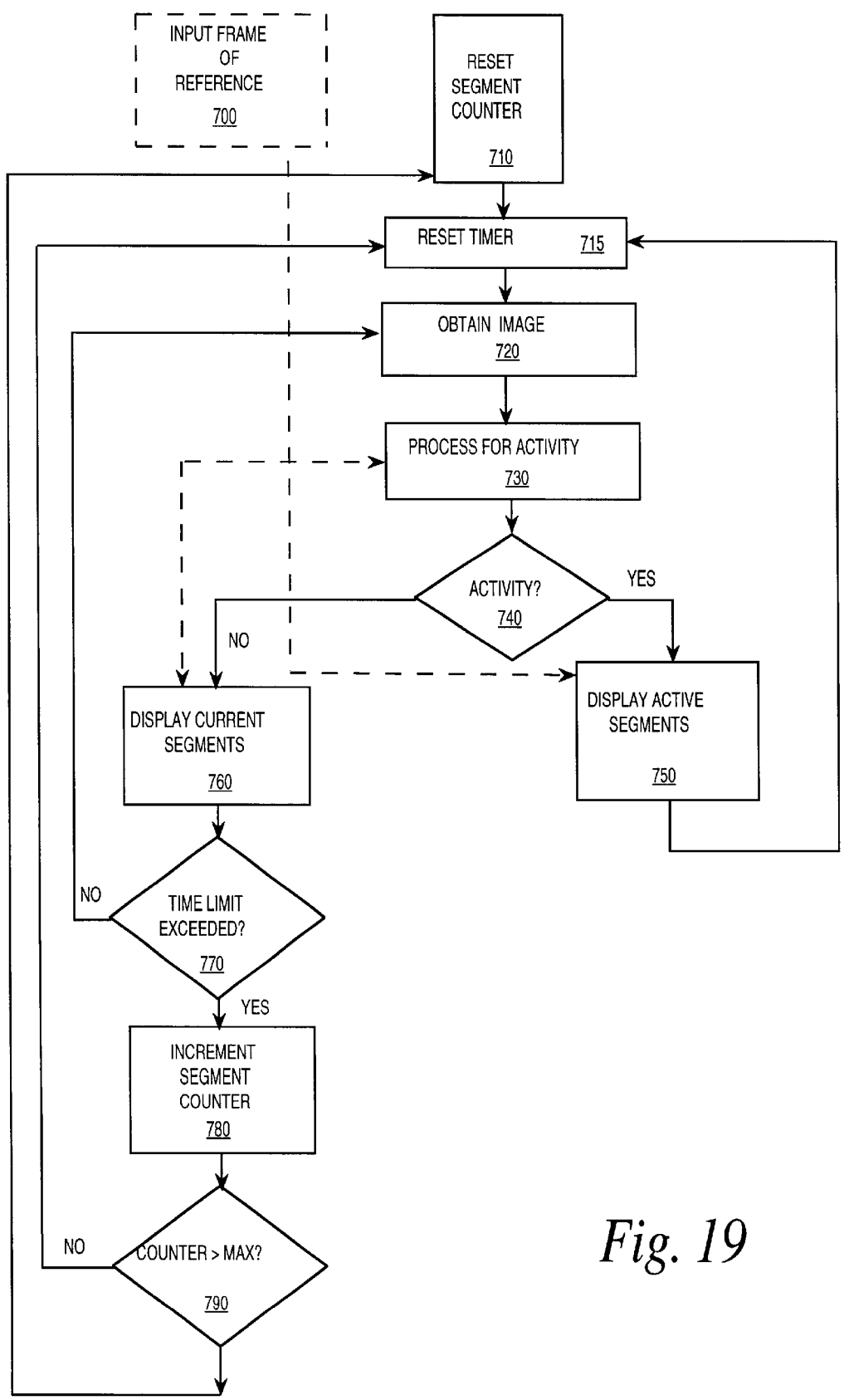
FIG. 19 shows a flow diagram of a method of automatically monitoring and panning an area using perceived camera control.

FIG. 19 shows a flow diagram of a monitoring and tracking system using the present invention. The software necessary to perform the monitoring/tracking functions may be located at the web site or at the user's terminal. The image/video signal to be processed for monitoring and/or tracking may be a live video feed or be played back from stored video. Thus, a wildlife scientist may leave multiple video cameras running overnight (or a single video camera with a wide-angle lens) and when the video tape is played back, the segments/cameras containing activity are displayed.

Referring to FIG. 19, an "input frame of reference" routine 700 is executed. This routine is optional, and is used to establish a frame of reference direction, such as north. The frame of reference may determine the first segment of a wide-angle image to view, or the first camera to view. Next, a "reset segment counter" routine 710 is executed. This sets the segment or camera to be first displayed.

Each segment or camera is viewed only for a limited time, prior to viewing the next segment or camera. Thus, a "reset timer" routine 715 is executed to reset the interval when segments or cameras are switched. Next, the "obtain image" routine 720 is executed. This routine obtains the wide angle image (live or prerecorded), or images from all the cameras (in the multiple camera perceived control embodiment of FIGS. 4 and 5). The obtained image from a wide-angle lens may be processed to remove the distortion or not, depending on what is being monitored.

The obtained image is processed to determine active areas (cameras or segments). Active areas are ares where the processor determines that activity is taking place, either by changes in the pixels at those locations, by using other known image/video processing techniques, or by using external sensors. The processing is performed as known in the art and is not described further herein. The processing occurs during the "process for activity" routine 730. This routine uses the frame of reference to determine which segment(s), relative to the normal (i.e. north) is/are active.

If activity is present, the "display active segments" routine 750 displays the active segments or cameras on a display. Distortion from the relevant segments is removed in the wide-angle lens embodiment. If more than one segment is active, a split screen display may show the each segment simultaneously. The each split screen display may make reference to the frame of reference which was previously entered during routine 700. The "reset timer" routine 710 is then executed so that the last segment under view is returned when activity is no longer present.

If activity is not present, the "display current segment" routine 760 is executed. This routine displays the current segment or camera until the timer expires, at which point the next segment or camera is displayed. The display may make reference to the frame of reference which was previously entered during routine 700.

After displaying the current segment or camera, the "time limit exceeded" routine 770 is executed. If the time limit has not been exceeded, a branch to the "obtain image" routine 720 occurs and processing continues until the time limit is exceeded, or until activity occurs. In an "autopan" embodiment (FIG. 5) the time limit value may be increased by pressing the "−" button in conjunction with the "speed" button (FIG. 5), for a slower autopan, and the time limit may be decreased by pressing the "+" button in conjunction with the "speed" button (FIG. 5) for a faster autopan.

If the time limit is exceeded, the, the segment (or camera) counter is incremented by the "increment segment counter" routine 780. If the counter is greater than the maximum number of cameras or segments, the "counter>max" routine 790 branches to the "reset segment counter" routine 710, to restart the automatic panning. If the counter is not greater than allowed, a branch occurs to the "reset timer" routine 715 so that the next segment or camera may be displayed, and processing for activity continues.

Thus, the flow chart of FIG. 19 allows for automatic panning and for automatic tracking. If the "process for activity" routine 730, the "activity?" test 740, and the "display active segments" routine 750 were removed, the "autopan" function described previously and shown with respect to FIG. 5 would be achieved. In this case, "display current segment" routine 760 would follow "obtain image" routine 740.

Monitoring and automatic panning may be combined. When combined, all active segments or cameras are automatically panned for a brief timeframe. Thus, if a lion and zebra are both moving towards the camera from opposite direction, each would be displayed for a brief timeframe before switching to a display of the other. This is an alternative to the split screen display previously described.

9. Display of Video Data.

In certain embodiments of the present invention, the user may select or be provided data concerning the video currently displayed. For example, superimposed on the video may be the date and time the video was recorded, a name of the image location, remaining time for the video, or data pertaining to the segment (or camera source) of the video which is currently being viewed.

This segment/camera data may be a compass heading (such as north) or angle from a reference (such as 40 degrees), or coordinate information (such as X/Y, X/Y/Z, R/Θ, X/R/Θ etc . . . ) relating to the location of the center of the segment/video currently displayed in relation to the wide angle image or other cameras. A graphical representation of the lens (or layout of the cameras) may show which segment of the wide angle image (or camera) is being displayed. In order to display the image segment, a frame of reference may be adopted, especially for a spherical lens. The frame of reference would be either generated by a processor at the web site or user's terminal, or entered by a user or operator. For example, the user may select which direction is "north" or position the axis of a coordinate system if a coordinate display is to be used for a particular lens.

Additionally, the image's magnification and its density/colors may also be shown on the display, such as "magnification=10x, picture density=200x200 pixels, 64 colors."

The display of image data may be used in all embodiments of the present invention, and are preferably updated when the displayed image changes.

Figure 20:
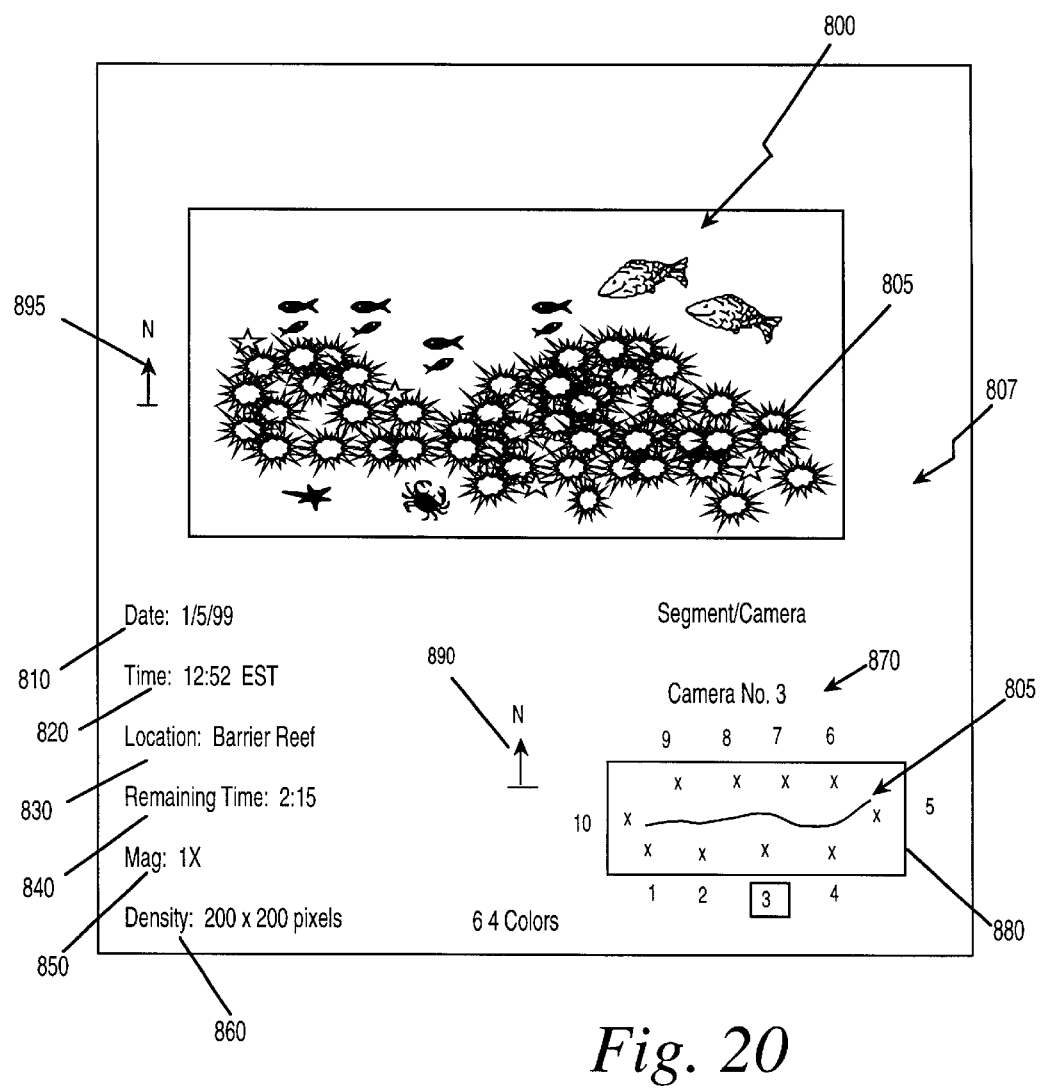
FIG. 20 is an exemplary screen display of the present invention, showing video and also showing video data.

FIG. 20 shows an exemplary display 800 showing a coral reef 805 where users have virtual camera control via multiple underwater cameras. On the screen 807, the date 810 is displayed along with the time 820. The location is shown at 830 and the remaining time of the program at 840. The magnification is shown at 850 and the density and colors at 860. The segment camera field 870 shows that the user is viewing camera no. 3. This segment/camera data may be shown graphically, as depicted at 880. Field 880 is a top view of the coral reef 805 and the layout of the cameras, in this case cameras 1 through 10. The square around camera no. 3 indicates that this camera is the source of the picture on the display 800. The frame of reference (north) is indicated at 890 for the graphical segment data and 895 for the video data.

10. Storing Video and Interactive Presentations.

The images, video, and image data may also be stored at the user's terminal (or receiving apparatus). Preferably, the wide angle distorted image is stored, along with the image data, if present. Storage of the image and image data enables the user to retrieve the image and view a segment at a later date. Optionally, the entire interactive presentation may be stored at the user's terminal (including associated graphics, text, video, data, or other information), although all the pertinent files and data would have to be received by the user.

The disclosure of PCT Publication No. WO 96/08105, published Mar. 14, 1996 by Labun, incorporated herein by reference is related to storing images and may be used with the present invention.

The video or image may be stored in either its distorted or undistorted state. Storing the video or image in its undistorted state has the advantage in that tall and/or wide pictures may be stored in their most viewable state, and in that editing may be performed on the images more easily if they are retrieved with the distortion removed.

11. Broadcast Television and Cable Television.

The perceived camera control of the present invention may also be used in the field of broadcast television or the field of cable television. Rather than supply the wide angle images (FIGS. 8A and 8B) to terminals via the internet, a transmitter may broadcast the images to television receivers. The television receivers are equipped with decoders to decode the wide-angle image as, for example only, disclosed in U.S. Pat. No. 5,384,588, issued Jan. 24, 1995 to Martin et al., incorporated herein by reference. The broadcast television transmitter (not shown) may be connected to remote cameras 104 (FIGS. 1–3), output interface 235 (FIG. 9B), internet hosts 272, 274, 276, 278, 280 (FIG. 10), communications media 120, 125 (FIG. 8B), or even a user's terminal 302, 304, 306, 308, 310 (FIG. 10).

In the field of cable television, a separate decoder or a cable set top converter box contains the appropriate decoding circuitry. A cable television transmitter is connected to remote cameras 104 (FIGS. 1–3), output interface 235 (FIG. 9B), internet hosts 272, 274, 276, 278, 280 (FIG. 10), communications media 120, 125 (FIG. 8B), or even a user's terminal 302, 304, 306, 308, 310 (FIG. 10).

U.S. Pat. No. 5,559,549, issued Sep. 24, 1996 to Hendricks et al., incorporated herein by reference, discloses a cable television system using an operation center 1000, network controller 1020, concatenated cable system (unnumbered), and set top terminals 1030. The cable television system is preferably, digital, and may easily interact with the present invention.

FIG. 21 shows the interaction between an embodiment of the present invention 900 and, for example, the general system 910 of the Hendricks et al. '549 patent. Digital signals from the present invention, relating to ordinary video, stored video, wide-angle video, video from multiple cameras, information of any type and interactive presentations may be provided to various elements of the Hendricks et al. '549 patent 910. It is understood that such digital signals may be supplied to corresponding elements of traditional analog and digital cable television systems that accept digital signals at an input (i.e. stand-alone or using a digital to analog converter).

Specifically, digital video 920 from remote camera 104 and remote wide-angle digital video 930, processed/compressed digital video 940 from computer 184, video 950 from communication network 120, streamed video 960 from web site 140, video 970 from communications network 125, and video 980 from the user terminals (i.e. 302) may be communicated to the digital cable television system of the '549 Hendricks et al patent. These video signals may be received by either the operations center 1000, satellite 1010, cable headend 1020, or set top terminals 1030 of the '549 Hendricks et al patent.

Likewise, the operations center 1000, satellite 1010, cable headend 1020, and set top terminals 1030 may communicate digital signals to the internet structure of the present invention. Specifically, these communicated signals may be received by the remote computer 184, data communication network 120 (including web site 130), data communication network 125, and user terminals (i.e. 302).

U.S. Pat. No. 5,600,573 to Hendricks et al, incorporated herein by reference, discloses an operations center with a file server. This operations center may substitute for the operations center 1000 shown in FIG. 21.

U.S. pending patent application Ser. No. 08/352,205, filed Dec. 2, 1994, entitled NETWORK MANAGER FOR CABLE TELEVISION SYSTEM HEADENDS, now U.S. Pat. No. 6,210,536 incorporated herein by reference, discloses a network manager for a cable headend. This network manager may be included in the cable headend 1020 shown in FIG. 21.

Thus, the present invention is capable of fully integrating with cable television systems able to transmit and receive digitally. The present invention breaks down the barrier between television networks and computer networks, allowing for a single integrated programming system.

It will be appreciated by the artisan of ordinary skill that other aspects of the patent applications, patents and publications incorporated herein by reference may be applied to the present invention. As such, the patent applications, patents and publications are incorporated herein in their entirety. The terms and descriptions used herein are set forth by way of illustration only and are not meant as limitations. Those skilled in the art will recognize that numerous variations are possible within the spirit and scope of the invention as defined in the following claims.

What is claimed is:

1. A system for providing a user with perceived camera control via a web site, comprising:

communications equipment to receive camera control commands from one or more connected users and to transmit video to the one or more connected users, including a command to monitor a remote site;

video of different views of the remote site;

an administrative unit, wherein the administrative unit determines which view of the remote site to transmit to a connected user in response to a received camera control command, thereby providing the connected user with the perception of camera control, and wherein the administrative unit, in response to the command to monitor the remote site:

selects views of the remote site displaying activity if activity is present; and automatically pans the remote site if activity is not present.

2. The system of claim 1, wherein the system further comprises a video storage unit, wherein the video storage unit supplies video of different views of the remote site to the web system.

3. The system of claim 2, wherein the video of different views of the remote site is video of different camera angles of the remote site.

4. The system of claim 2, wherein the video of different views of the remote site is a distorted wide angle video of the remote site, and wherein the system further comprises a means for removing distortion from at least one view of the wide angle video.

5. A method of remotely viewing a remote site, the method comprising the steps of:

accessing a communications network, wherein the communications network is the Internet;

addressing a web site on the Internet;

selecting a remote site;

receiving video depicting one or more views of the remote site via the communications network;

entering commands regarding a different view of the remote site;

displaying the different view of the remote site; and processing the video for activity at the remote site, wherein the step of displaying includes the step of:

selecting views of the remote site displaying activity if activity is present; and automatically panning the remote site if activity is not present.

6. The method of claim 5, wherein the received video is distorted wide angle video, and wherein the step of displaying comprises the step of removing distortion from a segment of the distorted wide angle video pertaining to the different view to be displayed.

7. The method of claim 5, wherein the received video is video from one of a plurality of remote cameras, and further comprising the steps of:

processing the entered command to select one of the remote cameras in accordance with the commanded different view; and receiving video of the different view from the selected remote camera.

8. The method of claim 7, wherein the displaying step further includes the step of indicating the location of the selected remote camera and a frame of reference at the remote site.

9. The method of claim 8, wherein the step of indicating further comprises the step of graphically displaying a layout of cameras at the remote site with respect to the frame of reference.

10. The method of claim 5, wherein the displaying step further includes the step of indicating the location of a frame of reference at the remote site.

11. The method of claim 5 wherein the displaying step further includes the step of indicating data concerning the video, the data selected from the group consisting of: remote site location, remote site time.

12. The method of claim 5 wherein the displaying step further includes the step of indicating data concerning the video, the data selected from the group consisting of: magnification, pixel density of the video, number of colors in the video.

13. The method of claim 5, wherein the received video is wide angle distorted video, and the step of processing includes the step of removing distortion from at least a portion of the received video to detect whether activity is present.

14. The method of claim 13, wherein the step of selecting includes the step of choosing segments of the wide angle video for viewing, and the step of displaying further includes the step of removing distortion from the chosen segments.

15. The method of claim 5, wherein the received video is video from a plurality of cameras, and the step of selecting includes the step of choosing one or more cameras for viewing if activity is present.

16. The method of claim 5, wherein the entered command is a command to automatically pan the remote site, and wherein the step of displaying further includes the step of incrementally viewing, for a fixed time, a plurality of different views of the remote site.

17. The method of claim 16, further comprising the step of:

selecting whether to increase or decrease the fixed time.

18. The method of claim 5, further comprising the steps of:

receiving data and graphics concerning the remote site; and where the step of displaying further comprises the step of showing the data and graphics.

19. The method of claim 18, further comprising the step of saving the video, graphics, and data in a storage media.

20. A method of remotely viewing a remote site, the method comprising the steps of:

accessing a communications network;

receiving video depicting one or more views of the remote site via the communications network;

processing the video for activity at the remote site;

entering commands regarding a different view of the remote site, wherein the entered command is a command to monitor the remote site;

displaying the different view of the remote site, wherein the step of displaying includes the steps of:

selecting views of the remote site displaying activity if activity is present; and automatically panning the remote site if activity is not present.

21. The method of claim 5, further comprising the step of saving the video, graphics, and data in a storage media.

22. The method of claim 20, wherein the received video is wide angle distorted video, and the step of processing includes the step of removing distortion from at least a portion of the received video to detect whether activity is present.

23. The method of claim 22, wherein the step of selecting includes the step of choosing segments of the wide angle video for viewing, and the step of displaying further includes the step of removing distortion from the chosen segments.

24. The method of claim 20, wherein the received video is video from a plurality of cameras, and the step of selecting includes the step of choosing one or more cameras for viewing if activity is present.

25. The method of claim 20, wherein the entered command is a command to automatically pan the remote site, and wherein the step of displaying further includes the step of incrementally viewing, for a fixed time, a plurality of different views of the remote site.

26. The method of claim 25, further comprising the step of: selecting whether to increase or decrease the fixed time.

* * * * *